US010733536B2

(12) United States Patent
Bates et al.

(10) Patent No.: US 10,733,536 B2
(45) Date of Patent: Aug. 4, 2020

(54) POPULATION-BASED LEARNING WITH DEEP BELIEF NETWORKS

(71) Applicant: Mtelligence Corporation, San Diego, CA (US)

(72) Inventors: Alexander B. Bates, San Diego, CA (US); Caroline Kim, San Francisco, CA (US); Paul Rahilly, San Diego, CA (US)

(73) Assignee: Mtelligence Corporation, San Diego, CA (US)

( * ) Notice: Subject to any disclaimer, the term of this patent is extended or adjusted under 35 U.S.C. 154(b) by 321 days.

(21) Appl. No.: 15/721,040

(22) Filed: Sep. 29, 2017

(65) Prior Publication Data

US 2018/0082217 A1    Mar. 22, 2018

Related U.S. Application Data

(63) Continuation of application No. 14/836,848, filed on Aug. 26, 2015, now Pat. No. 9,842,302, which is a
(Continued)

(51) Int. Cl.
*G06N 20/00* (2019.01)
*G05B 23/02* (2006.01)
*G05B 19/418* (2006.01)

(52) U.S. Cl.
CPC ........... *G06N 20/00* (2019.01); *G05B 23/024* (2013.01); *G05B 19/4184* (2013.01); *Y02P 90/14* (2015.11); *Y02P 90/18* (2015.11)

(58) Field of Classification Search
CPC .. G05B 19/4184; G05B 23/024; G06N 20/00; Y02P 90/14; Y02P 90/18
See application file for complete search history.

(56) References Cited

U.S. PATENT DOCUMENTS

| 5,764,155 A | 6/1998 | Kertesz et al. |
| 5,923,834 A | 7/1999 | Thieret et al. |

(Continued)

FOREIGN PATENT DOCUMENTS

| JP | 2009-510601 | 3/2009 |
| JP | 2013-058222 | 3/2013 |

(Continued)

OTHER PUBLICATIONS

Extended European Search Report for European Application No. 15835656.8, "Population Based Learning With Deep Belief Networks", dated Sep. 29, 2017 (8 pages).
(Continued)

*Primary Examiner* — Mischita L Henson
(74) *Attorney, Agent, or Firm* — Hamilton, Brook, Smith & Reynolds, P.C.

(57) ABSTRACT

A plant asset failure prediction system and associated method. The method includes receiving user input identifying a first target set of equipment including a first plurality of units of equipment. A set of time series waveforms from sensors associated with the first plurality of units of equipment are received, the time series waveforms including sensor data values. A processor is configured to process the time series waveforms to generate a plurality of derived inputs wherein the derived inputs and the sensor data values collectively comprise sensor data. The method further includes determining whether a first machine learning agent may be configured to discriminate between first normal baseline data for the first target set of equipment and first failure signature information for the first target set of equipment. The first normal baseline data of the first target set of equipment may be derived from a first portion of the sensor data associated with operation of the first plurality of units of equipment in a first normal mode and the first failure
(Continued)

signature information may be derived from a second portion of the sensor data associated with operation of the first plurality of units of equipment in a first failure mode. Monitored sensor signals produced by the one or more monitoring sensors are received. The first machine learning agent is then and activated, based upon the determining, to monitor data included within the monitored sensor signals.

22 Claims, 35 Drawing Sheets

Related U.S. Application Data continuation-in-part of application No. 14/469,535, filed on Aug. 26, 2014, now abandoned.

(60) Provisional application No. 62/042,194, filed on Aug. 26, 2014, provisional application No. 61/870,170, filed on Aug. 26, 2013.

(56) References Cited

U.S. PATENT DOCUMENTS

| | | |
|---|---|---|
| 6,192,325 B1 | 2/2001 | Piety et al. |
| 6,266,713 B1 | 7/2001 | Karanam et al. |
| 6,411,963 B1 | 6/2002 | Seese et al. |
| 6,421,571 B1 | 7/2002 | Spriggs et al. |
| 6,466,934 B2 | 10/2002 | Seese et al. |
| 6,513,044 B2 | 1/2003 | Seese et al. |
| 6,587,900 B1 | 7/2003 | Wischinski |
| 6,600,964 B2 | 7/2003 | Hess et al. |
| 6,687,761 B1 | 2/2004 | Collins et al. |
| 6,775,576 B2 | 8/2004 | Spriggs et al. |
| 6,813,587 B2 | 11/2004 | McIntyre et al. |
| 6,889,096 B2 | 5/2005 | Spriggs et al. |
| 6,901,432 B2 | 5/2005 | Peterson et al. |
| 6,993,576 B1 | 1/2006 | Labedz et al. |
| 7,082,379 B1 | 7/2006 | Bickford et al. |
| 7,085,841 B2 | 8/2006 | Edwards et al. |
| 7,117,119 B2 | 10/2006 | Van Dyk et al. |
| 7,120,558 B2 | 10/2006 | McIntyre et al. |
| 7,133,727 B2 | 11/2006 | Van Dyk et al. |
| 7,146,230 B2 | 12/2006 | Glanzer et al. |
| 7,151,966 B1 | 12/2006 | Baier et al. |
| 7,181,370 B2 | 2/2007 | Furem et al. |
| 7,181,493 B2 | 2/2007 | English et al. |
| 7,509,537 B1 | 3/2009 | Jensen et al. |
| 7,512,906 B1 | 3/2009 | Baier et al. |
| 7,539,724 B1 | 5/2009 | Callaghan |
| 7,548,970 B2 | 6/2009 | Labedz et al. |
| 7,606,919 B2 | 10/2009 | Labedz et al. |
| 8,005,647 B2 | 8/2011 | Armstrong et al. |
| 8,145,444 B1 | 3/2012 | Bickford et al. |
| 8,200,620 B2 | 6/2012 | Akiyama et al. |
| 8,380,842 B2 | 2/2013 | Bates et al. |
| 8,825,567 B2 | 9/2014 | Jiang et al. |
| 9,535,808 B2 | 1/2017 | Bates et al. |
| 9,842,302 B2 | 12/2017 | Bates et al. |
| 10,192,170 B2 | 1/2019 | Bates et al. |
| 2001/0001851 A1 | 5/2001 | Piety et al. |
| 2001/0032202 A1 | 10/2001 | Seese et al. |
| 2001/0032206 A1 | 10/2001 | Seese et al. |
| 2002/0103828 A1 | 8/2002 | Kupiec et al. |
| 2002/0116486 A1 | 8/2002 | Toure et al. |
| 2002/0161674 A1 | 10/2002 | Scheer |
| 2002/0183971 A1 | 12/2002 | Wegerich et al. |
| 2002/0198990 A1 | 12/2002 | Bradfield et al. |
| 2003/0004598 A1 | 1/2003 | Morris |
| 2003/0004987 A1 | 1/2003 | Glanzer et al. |
| 2003/0023518 A1 | 1/2003 | Spriggs et al. |
| 2003/0028269 A1 | 2/2003 | Spriggs et al. |
| 2003/0126222 A1 | 7/2003 | Peterson et al. |
| 2003/0200060 A1 | 10/2003 | Eryurek et al. |
| 2003/0200130 A1 | 10/2003 | Kall et al. |
| 2004/0024572 A1 | 2/2004 | Pagnano et al. |
| 2004/0143628 A1 | 7/2004 | Bradford et al. |
| 2004/0153594 A1 | 8/2004 | Rotvold et al. |
| 2005/0010931 A1 | 1/2005 | Langkafel et al. |
| 2005/0027379 A1 | 2/2005 | Dyk et al. |
| 2005/0044532 A1 | 2/2005 | Pfander et al. |
| 2005/0060408 A1 | 3/2005 | McIntyre et al. |
| 2005/0083196 A1 | 4/2005 | Furem et al. |
| 2005/0143956 A1 | 6/2005 | Long et al. |
| 2005/0177533 A1 | 8/2005 | Herzog |
| 2005/0267882 A1 | 12/2005 | Aupperlee et al. |
| 2006/0058987 A1 | 3/2006 | Kumar et al. |
| 2006/0074498 A1 | 4/2006 | Kalan et al. |
| 2006/0133412 A1 | 6/2006 | Callaghan |
| 2006/0164296 A1 | 7/2006 | LaMothe et al. |
| 2006/0224361 A1 | 10/2006 | McIntyre et al. |
| 2006/0229848 A1 | 10/2006 | Armstrong et al. |
| 2006/0235951 A1 | 10/2006 | Edwards et al. |
| 2006/0259603 A1 | 11/2006 | Shrader et al. |
| 2007/0013232 A1 | 1/2007 | McNally et al. |
| 2007/0139211 A1 | 6/2007 | Pessin et al. |
| 2007/0143162 A1 | 6/2007 | Keever et al. |
| 2007/0226317 A1 | 9/2007 | Rydberg et al. |
| 2007/0226551 A1 | 9/2007 | Janke et al. |
| 2008/0079560 A1 | 4/2008 | Hall et al. |
| 2008/0271057 A1 | 10/2008 | Bates et al. |
| 2009/0037772 A1* | 2/2009 | Wegerich ........... G05B 23/0254 714/26 |
| 2009/0125755 A1 | 5/2009 | Herscovitz et al. |
| 2010/0082130 A1 | 4/2010 | Plache et al. |
| 2010/0083049 A1 | 4/2010 | Miki |
| 2010/0101785 A1 | 4/2010 | Khvoshchev et al. |
| 2010/0152878 A1 | 6/2010 | Chu et al. |
| 2010/0256794 A1 | 10/2010 | McLaughlin et al. |
| 2011/0033122 A1 | 2/2011 | Le Roux et al. |
| 2011/0224947 A1 | 9/2011 | Kriss |
| 2012/0078403 A1 | 3/2012 | Cahill et al. |
| 2012/0173671 A1 | 7/2012 | Callaghan et al. |
| 2012/0283963 A1 | 11/2012 | Mitchell et al. |
| 2013/0030765 A1 | 1/2013 | David |
| 2013/0191681 A1 | 7/2013 | Moiseev et al. |
| 2013/0226492 A1 | 8/2013 | Moiseev et al. |
| 2013/0268241 A1 | 10/2013 | Das et al. |
| 2014/0088893 A1 | 3/2014 | McGuire et al. |
| 2014/0188777 A1 | 7/2014 | Yan et al. |
| 2014/0351642 A1 | 11/2014 | Bates et al. |
| 2016/0116378 A1 | 4/2016 | Bates et al. |
| 2017/0083830 A1 | 3/2017 | Bates et al. |

FOREIGN PATENT DOCUMENTS

| | | |
|---|---|---|
| WO | WO 2014/145977 | 9/2014 |
| WO | WO 2016/033247 | 3/2016 |

OTHER PUBLICATIONS

Fischer, A. et al., "An Introduction to Restricted Boltzmann Machines," LNCS, 7441: 14-36 (2012).

Hinton, G., "A Practical Guide to Training Restricted Boltzmann Machines," Department of Computer Science, University of Toronto, pp. 1-21 (Aug. 2, 2010).

International Preliminary Report on Patentability for Int'l Application No. PCT/US2014/030840, titled: System and Methods for Automated Plant Asset Failure Detection, dated Sep. 15, 2015 (12 pages).

International Preliminary Report on Patentability for Int'l Application No. PCT/US2015/047047, titled: Population-Based Learning With Deep Belief Networks, dated Feb. 28, 2017 (4 pages).

International Search Report for Intl Application No. PCT/US2014/030840, titled: System and Methods for Automated Plant Asset Failure Detection, dated Aug. 26, 2014 (3 pages).

International Search Report for Int'l Application No. PCT/US2015/047047, titled: Population-Based Learning With Deep Belief Networks, dated Mar. 18, 2016 (3 pages).

Pardhan et al., "Deep Learning using Restricted Boltzmann machines," international Journal on Advanced Computer Theory and Engineering, 4(3): 10-15 (2015).

(56) References Cited

OTHER PUBLICATIONS

Written Opinion for Int'l Application No. PCT/US2014/030840, titled: System and Methods for Automated Plant Asset Failure Detection, dated Aug. 26, 2014 (3 pages).

Written Opinion for Int'l Application No. PCT/US2015/047047, titled: Population-Based Learning With Deep Belief Networks, dated Mar. 18, 2016 (3 pages).

Zhang et al., "Degradation Prediction Model Based on a Neural Network with Dynamic Windows," ISSN, 1424-8220: 6996-7015 (Mar. 23, 2015).

* cited by examiner

Sensor Template Raw Tags Example:
  Mud Pump Sensor Template
  Mud Pump Sensor 1Ch VMU Template
  Mud Pump Sensor 2Ch VMU Template
  Mud Pump Sensor 4Ch VMU Template
  Mud Pump Sensor 6Ch VMU Template
  Mud Pump Sensor 8Ch VMU Template
  Mud Pump Sensor 12Ch VMU Template Sensor Template-Derived Features
  For each of the above Raw Tag Sensor Templates, there is a corresponding Sensor Template with Derived Features Mud Pump with Derived Features Sensor Template
  Mud Pump 1Ch VMU with Derived Features Sensor Template
  Mud Pump 2Ch VMU with Derived Features Sensor Template
  Mud Pump 4Ch VMU with Derived Features Sensor Template
  Mud Pump 6Ch VMU with Derived Features Sensor Template
  Mud Pump 8Ch VMU with Derived Features Sensor Template
  Mud Pump 12Ch VMU with Derived Features Sensor Template

Prepare Data Wizard

Training DataSet

Training DataSet Profile

Name: Xxxxxx
Description:

600

Next >   Cancel

FIG. 6B

Prepare Data Wizard

Training DataSet

Select Asset

◇ Use Asset/Location
   Select...
   ID: Xxxxxxx
   Title: Xxxxxxx
   Description: Xxxxxxx  ← 606

◇ Use Failure Set
   Select: _____ ← 607

☐ Standalone ← 608

605

Next >   Cancel

Prepare Data Wizard

Training DataSet

Define Failures

Failure Work Filters
- Xxxx
- Xxxx
- Xxxx
- Xxxx
- Xxxx
- Xxxx
- Xxxx
- Xxxx

Refresh Work Order
- ☐ Include Failures from Child Entities
- ☐ Include Failures from All Child Entities (Resource) ← 632

Failure Work: [Select All] [Unselect All] [Check for Data...] [Create]  ← 631

| Name | ID | Work Cate. | Type | Fail Code | Title | Breakdown | Xxxxxx | Date |
|------|------|-----------|------|-----------|-------|-----------|--------|------|
| ☐ | Xxxx | UnPlanned | PM | | Xxxxx | ☐ | 0 | 5/5/2011 |
| ☐ | Xxxx | UnPlanned | PM | Xxxxx | Xxxxx | ☐ | 0 | 5/5/2011 |
| ☐ | Xxxx | UnPlanned | PM | | Xxxxx | ☐ | 0 | 5/5/2011 |

[Next >] [Cancel]

Sensor Role Offline Condition

Sensor:: "RunStatus" == 0

| Asset Id | Offline Condition |
|---|---|
| ✓ Pump 1 | CsvTagSource:."KM_snysvt".ESP199-6_RUN_STATUS.F_CV" == 0 |
| Pump 2 | CsvTagSource:."KM_SNYSVRS.ESP68-3_RUN_STATUS.F_CV" == 0 |
| Pump 3 | CsvTagSource:."EQUATE_OL2KT_2908_V2_VOTTH_OUT.PV" == 0 |

FIG. 17

Equipment set Wizard

Equipment set Wizard

Equipment Set Name & Description

Equipment Set Name:

Equipment Set Description: Centrifugal Pump

[ Next > ] [ Cancel ]

FIG. 18

Create DataSet Wizard

Create DataSet

Select Object(s)
○ Equipment Set
  [Select Equipment Set...]
  Equipment Set:
  Equipment Description:

| Date | Asset Id | Asset Name |
|------|----------|------------|
|      |          |            |

Asset Set:           Asset Name:

○ Standalone Asset
  [Select Asset...]

○ Independent Set of Tags

[Cancel]  [Next >]

FIG. 19

Select Entity

1) Select an equipment set of interest.

| Equipment Se... | Equipment Set | Description |
|---|---|---|
| 1 | TestAlex1 | |
| 2 | TestSet1 | |
| 3 | Centrifugal Pumps | |

Tag Mappings Report

2) Select asset(s) of interest by marking the checks in the checkbox column.
☑ Select All

| Select | Site | Asset ID | Install Date | Title | # of Failures |
|---|---|---|---|---|---|
| ☑ | Site 1 | Pump 1 | 1/1/2010 12:19... | Pump 1 | 2 |
| ☑ | Site 1 | Pump 2 | 1/1/2010 12:00... | Pump 2 | 0 |
| ☑ | Site 1 | Pump 3 | 1/1/2010 12:00... | Pump 3 | 0 |

[ OK ]   [ Cancel ]

FIG. 20

Create DataSet Wizard

Create DataSet

Define Failures

| Failure Work Filters |
|---|
| Xxxxx |
| Xxxxx |
| Xxxxx |
| Xxxxx |
| Xxxxx |
| Xxxxx |
| Xxxxx |

Refresh Work Orders

☐ Include Failures from Child entities
☐ Include Failures from All Child entities (Resource)

[ Chart by Date... ] [ Create Failure ]

☐ Select All

| Failure | Assets Id | Asset Name | Date | Work Id | Work Category | Title | Work Type |
|---|---|---|---|---|---|---|---|
| ☐ | Pump 1 | Pump 1 | 5/1/2014 12:19:00 PM | Pump 1... | Planned | Preventive Mont | PM |
| ☐ | Pump 1 | Pump 1 | 6/1/2014 4:18:00 PM | Pump 1... | Unplanned | Test Post | PM |
| ☐ | Pump 1 | Pump 1 | 6/20/2014 4:50:00 PM | Pump 1... | Unplanned... | Test Post 2 | EM |

[ Next > ] [ Cancel ]

FIG. 21

Create DataSet Wizard

Create DataSet

Select Data Processing data Range

Enter Search Year: 2011

Date Select | Get All Dates

| Assets Id | Asset Name | Start Date | End Date | Duration | Get Recommended Data |
|---|---|---|---|---|---|
| > Pump 1 | Pump 1 | 1/1/2014 12:00:00 AM | 8/25/2014 12:00:00 AM ▶ | 55.8 Month | Get Recommended Data |
| Pump 2 | Pump 2 | 1/1/2014 12:00:00 AM | 8/25/2014 12:00:00 AM | 55.8 Month | Get Recommended Data |
| Pump 3 | Pump 3 | 1/1/2014 12:00:00 AM | 8/25/2014 12:00:00 AM | 55.8 Month | Get Recommended Data |

Xxxxxxxx: 1 ◆ Hour (h) ▶

Failure Interval: 720 ◆ Hour (h) ▶

Next > | Cancel

Machine Learning Wizard

Machine Learning Wizard

Select Assets For Training

☑ Select All

Drag a column Header Xxxx Xxxx

| Select | Asset ID | Install Date | Title | # of Failure | Available From | Available Until |
|---|---|---|---|---|---|---|
| ☑ | Pump 1 | 1/1/2010 12:19:00 PM | Pump 1 | 2 | 1/1/2010 12:00:00 AM | 8/25/2014 12:00:00... |
| ☑ | Pump 2 | 1/1/2010 12:19:00 AM | Pump 2 | 0 | 1/1/2010 12:00:00 AM | 8/25/2014 12:00:00... |
| ☑ | Pump 3 | 1/1/2010 12:19:00 AM | Pump 3 | 0 | 1/1/2010 12:00:00 AM | 8/25/2014 12:00:00... |

[Next >] [Cancel]

FIG. 26

Machine Learning Wizard

Machine Learning Wizard
Select Faults/Failures

Failure Work Filters

| | |
|---|---|
| Xxxxx | |
| Xxxxx | |
| Xxxxx | ☐ |
| Xxxxx | |
| Xxxxx | ☐ |
| Xxxxx | |
| Xxxxx | |
| Xxxxx | |

[Refresh Work Orders]

☐ Use template setting
Target Failure: [____]

☐ Include Failures from Child entities
☐ Include Failures from All Child entities (Resource)

Failure Work: [Select All] [Unselect All] [Chart Xxxx Date]

| Failure | Assets Id | Asset Name | Failure ID | Date | Title | Work Category | Type | Fail Code |
|---|---|---|---|---|---|---|---|---|
| ∨ | Pump 1 | Pump 1 | Pump1_INSPECT... | 6/1/2014 4:18:00 PM | Test Fault | Unplanned | PM | ☐ |
| ☐ | Pump 1 | Pump 1 | Pump1_FAIL001... | 6/1/2014 4:18:00 PM | Test Fault 2 | Unplanned | PM | |

[Next >] [Cancel]

FIG. 27

POPULATION-BASED LEARNING WITH DEEP BELIEF NETWORKS

CROSS-REFERENCE TO RELATED APPLICATIONS

This application is a continuation of U.S. application Ser. No. 14/836,848, filed Aug. 26, 2015, which claims priority under 35 U.S.C. § 119(e) to U.S. Provisional Patent Application Ser. No. 62/042,194, entitled POPULATION-BASED LEARNING WITH DEEP BELIEF NETWORKS, filed on Aug. 26, 2014, and which is a continuation-in-part of application Ser. No. 14/469,535, entitled AUTOMATED PLANT ASSET FAILURE PREDICTION USING FAILURE INFORMATION TRANSFERRED BETWEEN PLANTS CONSISTENT WITH A UNIVERSAL EQUIPMENT TAXONOMY filed on Aug. 26, 2014, which claims priority to U.S. Provisional Patent Application Ser. No. 61/870,170, entitled AUTOMATED PLANT ASSET FAILURE PREDICTION USING FAILURE INFORMATION TRANSFERRED BETWEEN PLANTS CONSISTENT WITH A UNIVERSAL EQUIPMENT TAXONOMY, filed on Aug. 26, 2013, the contents of each of which are hereby incorporated by reference herein in their entirety for all purposes.

FIELD

The present disclosure relates generally to monitoring of equipment or other assets within a plant or industrial context and, more particularly, to systems and methods for predicting failure of such assets.

BACKGROUND

Large manufacturers today face extreme margin pressures from low-cost producers, rising energy costs, and regulatory and environmental restrictions. At the same time, environmental, health & safety compliance cannot be compromised. The need to improve asset performance has never been greater.

However, one of the greatest challenges for effectively improving plant asset performance is that the necessary information is scattered across disconnected silos of data in each department. Furthermore, it is difficult to integrate these silos due to several fundamental differences. For example, control system data is real-time data measured in terms of seconds, whereas maintenance cycle data is generally measured in terms of calendar based maintenance (e.g., days, weeks, months, quarters, semi-annual, annual), and financial cycle data is measured. in terms of fiscal periods. Industrial equipment vendors and enterprise software vendors tend to have proprietary coding schemes (e.g., work order status codes) and are non compliant with any universal standard.

SUMMARY

In one aspect the disclosure relates to a method for using failure signature information to monitor operation of one or more monitored units of equipment configured with one or more monitoring sensors. The method includes receiving, through a user interface, user input identifying a first target set of equipment including a first plurality of units of equipment, wherein each equipment unit of the first plurality of units of equipment is characterized by a first plurality of matching target parameters. The method further includes receiving a set of time series waveforms from sensors associated with the first plurality of units of equipment, the time series waveforms including sensor data values. A processor is configured to process the time series waveforms to generate a plurality of derived inputs wherein the derived inputs and the sensor data values collectively comprise sensor data. The method further includes determining whether a first machine learning agent may be configured to discriminate between first normal baseline data for the first target set of equipment and first failure signature information for the first target set of equipment. The first normal baseline data of the first target set of equipment may be derived from a first portion of the sensor data associated with operation of the first plurality of units of equipment in a first normal mode and the first failure signature information may be derived from a second portion of the sensor data associated with operation of the first plurality of units of equipment in a first failure mode. The method further includes receiving monitored sensor signals produced by the one or more monitoring sensors and activating, based upon the determining, the first machine learning agent to monitor data included within the monitored sensor signals.

The method may also involve identifying a second target set of equipment including a second plurality of units of equipment. In this case each equipment unit of the second plurality of units of equipment may be characterized by a second plurality of matching target parameters consisting of a subset of the first plurality of matching target parameters. The determining operation may further include determining whether a second machine learning agent may be configured to discriminate between second normal baseline data for the second target set of equipment and second failure signature information for the second target set of equipment. The second normal baseline data of the second target set of equipment may be derived from a portion of the sensor data relating to operation of the second target set of equipment in a second normal mode and the second failure signature information may be derived from a portion of the sensor data relating to operation of the second plurality of units of equipment in a second failure mode.

The disclosure also relates to another method for using failure signature information to monitor operation of one or more monitored units of equipment configured with one or more monitoring sensors. This method includes identifying a first target set of equipment including a first plurality of units of equipment. Each equipment unit of the first plurality of units of equipment may be characterized by a first plurality of matching target parameters. The method further includes receiving sensor data from sensors associated with the first plurality of units of equipment. The method may also involve determining, using a processor, whether a first machine learning agent may be configured to discriminate between first normal baseline data for the first target set of equipment and first failure signature information for the first target set of equipment. The first normal baseline data of the first target set of equipment may be derived from a portion of the sensor data associated with operation of the first plurality of units of equipment in a first normal mode and the first failure signature information may be derived from a portion of the sensor data associated with operation of the first plurality of units of equipment in a first failure mode. The method further includes receiving monitored sensor signals produced by the one or more monitoring sensors and activating, based upon the determining, the first machine learning agent to monitor data included within the monitored sensor signals.

In another aspect the disclosure pertains to a plant asset failure prediction system. The system includes a memory, a user interface, a network interface and a processor coupled to the memory and is configured to work in conjunction with plant equipment configured with various types of sensors. The user interface is configured to receive user input identifying a first target set of equipment including a first plurality of units of equipment, wherein each equipment unit of the first plurality of units of equipment is characterized by a first plurality of matching target parameters. During operation of the system, the network interface or other signal receiver receives a set of time series waveforms from sensors associated with the first plurality of units of equipment, the time series waveforms including sensor data values. The processor is configured with code to process the time series waveforms to generate a plurality of derived inputs. A collection of sensor data including at least one of a subset of the sensor data values and one or more of the derived inputs may then be identified using a sensor template. The method further includes determining whether a first machine learning agent may be configured to discriminate between first normal baseline data for the first target set of equipment and first failure signature information for the first target set of equipment. The first normal baseline data of the first target set of equipment may be derived from a first portion of the sensor data associated with operation of the first plurality of units of equipment in a first normal mode and the first failure signature information may be derived from a second portion of the sensor data associated with operation of the first plurality of units of equipment in a first failure mode. The method further includes receiving monitored sensor signals produced by the one or more monitoring sensors and activating, based upon the determining, the first machine learning agent to monitor data included within the monitored sensor signals.

BRIEF DESCRIPTION OF THE DRAWINGS

The inventions described in the present disclosure more fully appreciated in connection with the following detailed description taken in conjunction with the accompanying drawings, wherein:

FIGS. 2A and 2B are diagrams showing a manner in which a sensor template is created for a collection of equipment.

FIGS. 6A-6K show user interface screens displayed by a user interface module of an asset failure detection system.

FIGS. 11-28 illustrate methods for population-based learning with deep belief networks in accordance with the present disclosure.

DETAILED DESCRIPTION

Introduction to Transfer Learning

Figure 1A:
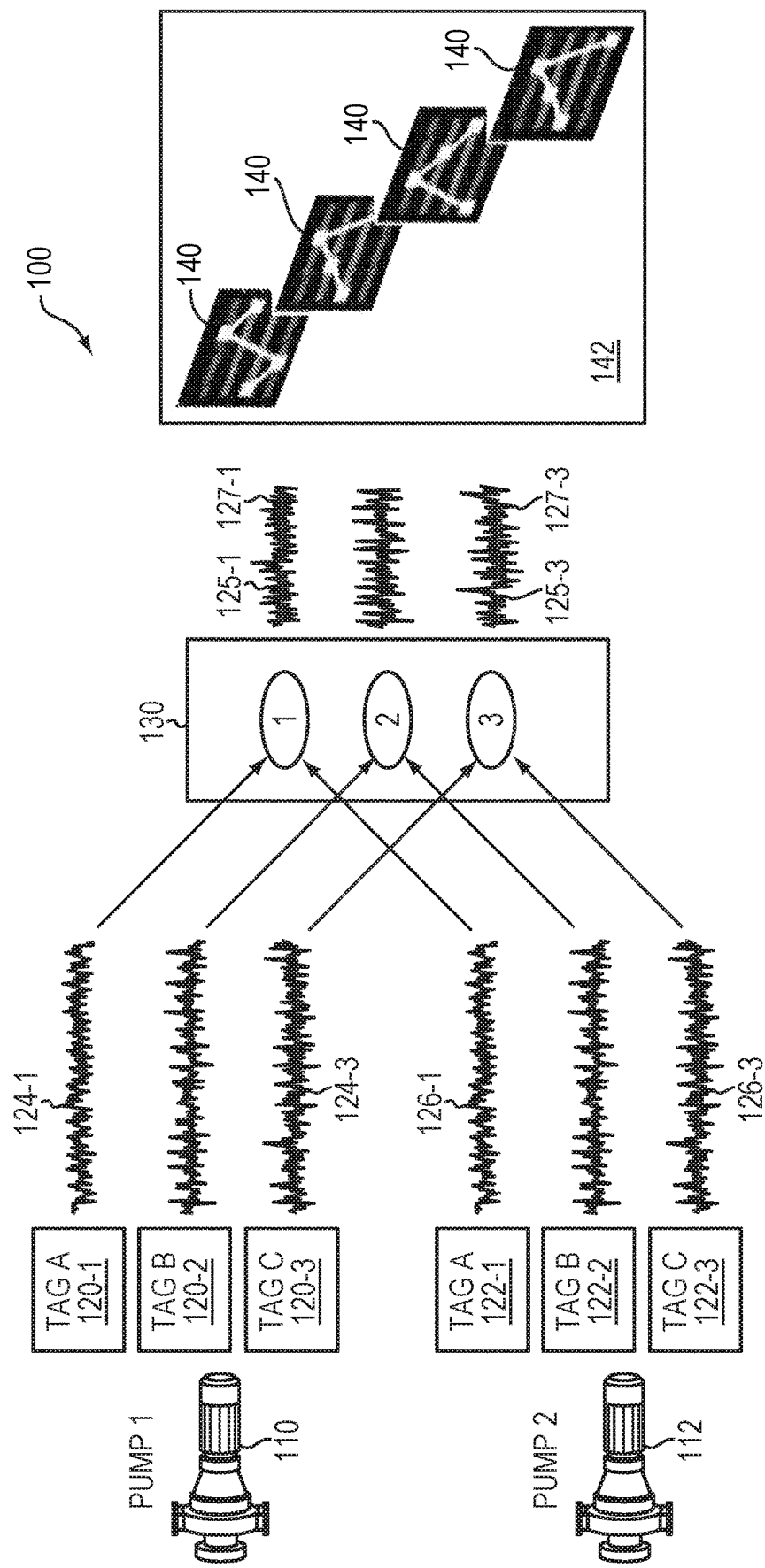
FIGS. 1A and 1B depict conceptual systems intended to illustrate principles of transfer learning in accordance with the present disclosure.

The present disclosure describes systems and methods for improving the reliability of industrial and other equipment by substantially reducing the incidence of failure in such equipment through effectively "learning" the operational and other conditions associated with equipment failure. This enables such failure to be averted upon detection of the onset of such conditions. In one embodiment this is achieved by evaluating data from, for example, sensors associated with such equipment in order to identify patterns or relationships within the sensor data associated with equipment failure. Such patterns or relationships, which may be referred to hereinafter as "failure signatures", may be stored within a failure signature library and made available to population of similar equipment along with baseline operating data. In this regard "similar" may be defined in terms of a collection of hierarchical sets, each defining broader degrees of similarity, based on a central equipment taxonomy. The taxonomy provides a sort of classification or "genome" for industrial equipment including information about operating context (i.e. offshore drilling rig→pump, or equipment type→centrifugal pump), make & model (i.e. Siemens SIMOTICS HV).

In one embodiment a global taxonomy of equipment broken down by equipment type, industry, make & model, and operating context is established. The taxonomy may be represented by a graph, with nodes in the graph representing sets of equipment sharing certain characteristics; that is, the taxonomy may be represented by a graph structure for defining set membership as opposed to strict hierarchy.

This adaptive system learns where transfer learning applies; in other words, it empirically learns what equipment (in what context) have characteristics similar enough to support transference of signatures and operating states from other equipment. It does this empirically, by taking the global repository of signatures and testing them on new instances of the equipment class, to see if there are too many false positives (i.e., if the existing signatures apply to the new instance or not). When installed at a subscriber site, in one embodiment all assets to be monitored are first linked to a global equipment taxonomy. This enables each asset to be mapped to, for example, a Make-Model-Revision key, and a set of OpContext (Operating Context) keys. These keys may then be used to determine set membership for the library of known failure signatures.

Derivation of Equipment Signatures Using Captured Sensor Data

In one embodiment each asset to be monitored is outfitted with a collection of sensors configured to provide data concerning operational and state characteristics of the applicable asset. The transfer learning techniques described herein will generally be most effective when member assets among which information and intelligence is to be effectively transferred are associated with similar numbers and types of sensors. However, the correspondence between the sensors associated with different assets need not be exact, and methods will be described for addressing instances in which member assets are "missing" sensors or include "extra" sensors.

Turning now to FIG. 1A, there is shown a diagram of a conceptual system 100 intended to illustrate principles of transfer learning in accordance with the present disclosure. As shown, the system includes units of equipment, i.e., a centrifugal pump asset 110 and a centrifugal pump asset 112 comprising equipment instances to be monitored. A first collection of sensors 120 is associated with the pump asset 110 and a second collection of sensors 122 is associated with the second pump asset 112. Each of the sensors 120 and 122 produces data in the form of a time series waveform indicative of some aspect of the operation or state of asset 110 or asset 112. The time series waveforms 124 produced by the sensors 120 over some period of time may define a "signature" 125 representative of the state and/or operation of the asset 110 during this time. Similarly, time series waveforms 126 produced by the sensors 122 over some period of time may define a signature 127 representative the state and/or operation of the asset 112 during the time period. A sensor template 130 is defined to standardize the sensor profile of inputs for transfer learning. In the embodiment of FIG. 1A, the sensor template 130 indicates that that the "raw" data values produced by each sensor 120 and 122 specified by the template 130 should be received and processed. The sensor template 130 may be specific to a particular make/model of the pump asset 110 and the pump asset 112 (e.g., make XYZ, model A).

During operation of the system 100, signatures 125 defined by the data collected from the sensors 120 over configurable time windows, i.e., prediction intervals, are compared with known "failure signatures" 140 maintained within a library 142 of known failure signatures in order to predict or otherwise determine when failure of the asset 110 is likely to occur. The library 142 of known failure signatures may be developed based upon sensor data collected from a large number of assets similar or identical to the assets 110 and 112 in the manner described hereinafter. The signatures 127 defined by the data collected from the sensors 122 may be similarly compared with the known failure signatures 140 in order to predict or otherwise determine when failure of the asset 112 is likely to occur. In this way knowledge relating to potential failure scenarios is effectively transferred to the assets 110 and 112 (or to the applicable control system) through comparison of the signatures 125, 127 developed by the sensors 120 and 122 to the known failure signatures 140.

Figure 1B:
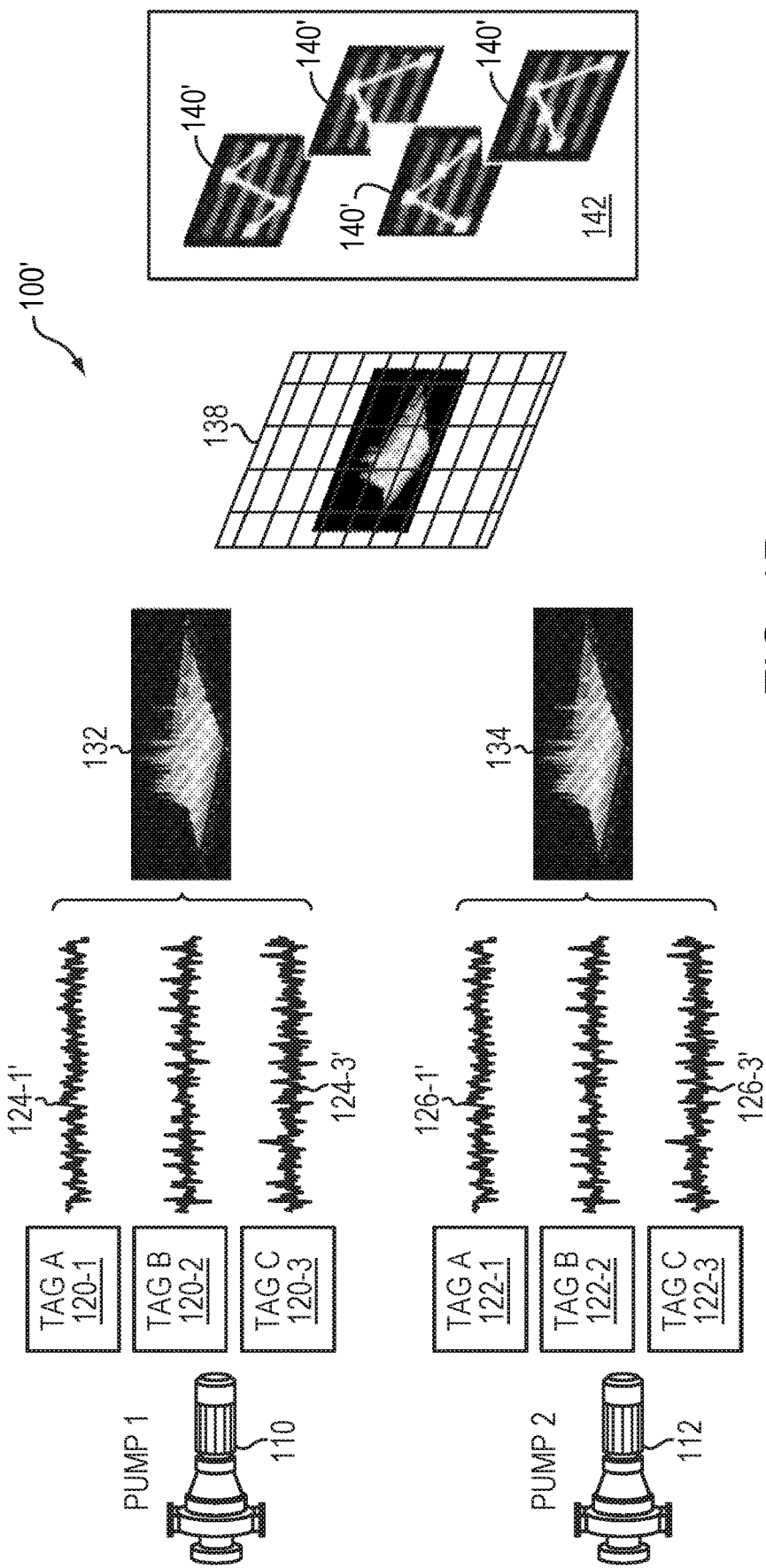

Attention is now directed to FIG. 1B, which depicts a diagram of a conceptual system 100' for effecting transfer learning among equipment assets in a manner similar to that described with reference to the system 100 of FIG. 1A. However, in the system 100' the signatures of the assets 110 and 112 being monitored are developed not only from the time series waveforms 124', 126' produced by the sensors 120 and 122, but also from derived inputs generated on the basis of such waveforms 124', 126'. Specifically, a first collection of derived inputs 132 is generated by processing the time series waveforms 124' from the sensors 120 and a second collection of derived inputs 134 is generated by processing the time series waveforms 126' from sensors 122. A sensor template 138 identifies the raw data values produced by each sensor 120 and 122 and/or the first and second collections of derived inputs 132 and 134 that are to be received and utilized as described hereinafter. In one embodiment the sensor template 138 comprises an N-dimensional sensor template linked to the make/model and operational context (OpContext) of the pump assets 110, 112.

In one embodiment the first and second collections of derived inputs 132 and 134 are calculated by applying signal processing algorithms to the streams of raw data values produced by each sensor 120 and 122. Such signal processing may include, for example, calculating power spectrum (frequency components extracted via Discrete Fourier Transform) for each sensor 120 and 122; first derivative (rate of change), and second derivative (rate of rate of change), aggregates, memory interval, and multi-resolution windows. In this way salient features concerning each stream of sensor data are captured prior to invoking machine learning agents in the manner discussed below. The aggregates calculated for each stream of sensor data values (for each sample interval) may include, for example, average, maximum, minimum, and standard deviation. For example, if sampling of the sensors 120 and 122 is occurring at 1-minute intervals, then the instantaneous sample value (i.e., current sensor value) is captured each minute. In addition, aggregate values are extracted across the interval. In this way higher-resolution features are also captured. For example, in the case in which sensor values are oscillating rapidly, the standard deviation will increase and be captured as an aggregate.

In one embodiment the power spectrum aggregate is calculated in the following manner. First, a Fast Fourier Transform is applied and followed by a band pass filtering operation in order to restrict frequency range. The Window Length used in the FFT calculation is configurable, based on the sampling resolution. For example, if the solution is configured to sample data at a 1 second interval, with Window Length N=60, a resulting array from the FFT of length N/2=30 is produced, with each array item representing the intensity of the frequency at that position. The elements of this array are then compressed into 10 (logarithmically) spaced bins; that is, the 60 samples in the time domain are reduced to 30 bins in the frequency domain, which are then summed in 10 items in logarithmic scale. Thus, in this example the original quantity of data is reduced by a factor of 6.

In one embodiment, the following derived features are calculated for each tag of each sensor:
1. First Derivative
2. Second Derivative
3. Power Spectrum—array of 10 frequency bins (on logarithmic scale) for each sensor/tag
    a. Frequency [10]—each bin contains intensity for that frequency band
4. Aggregates calculated based on sampling interval
    a. Average
    b. Minimum
    c. Maximum
    d. Standard Deviation
5. Memory Window—incorporate window to include past sensor data along with present, exposing event sequence signatures
6. Multi-Resolution Window—incorporate narrow window of high resolution data, along with wider window of low resolution data. For example, for each time step, would include a 60-second window of second data, a 24-hour window of minute data, and a 30-day window of hourly data.

Thus, for each time step, for each tag, in addition to the sample (current) value of the tag, following derived inputs are also calculated:
Derivative (scalar)
Second Derivative (scalar)
Power Spectrum (vector of length 10)
Aggregates (vector of length 4)
Memory (vector of configurable length)
Multi-Resolution Window (vector of configurable length)

Figure 2A:
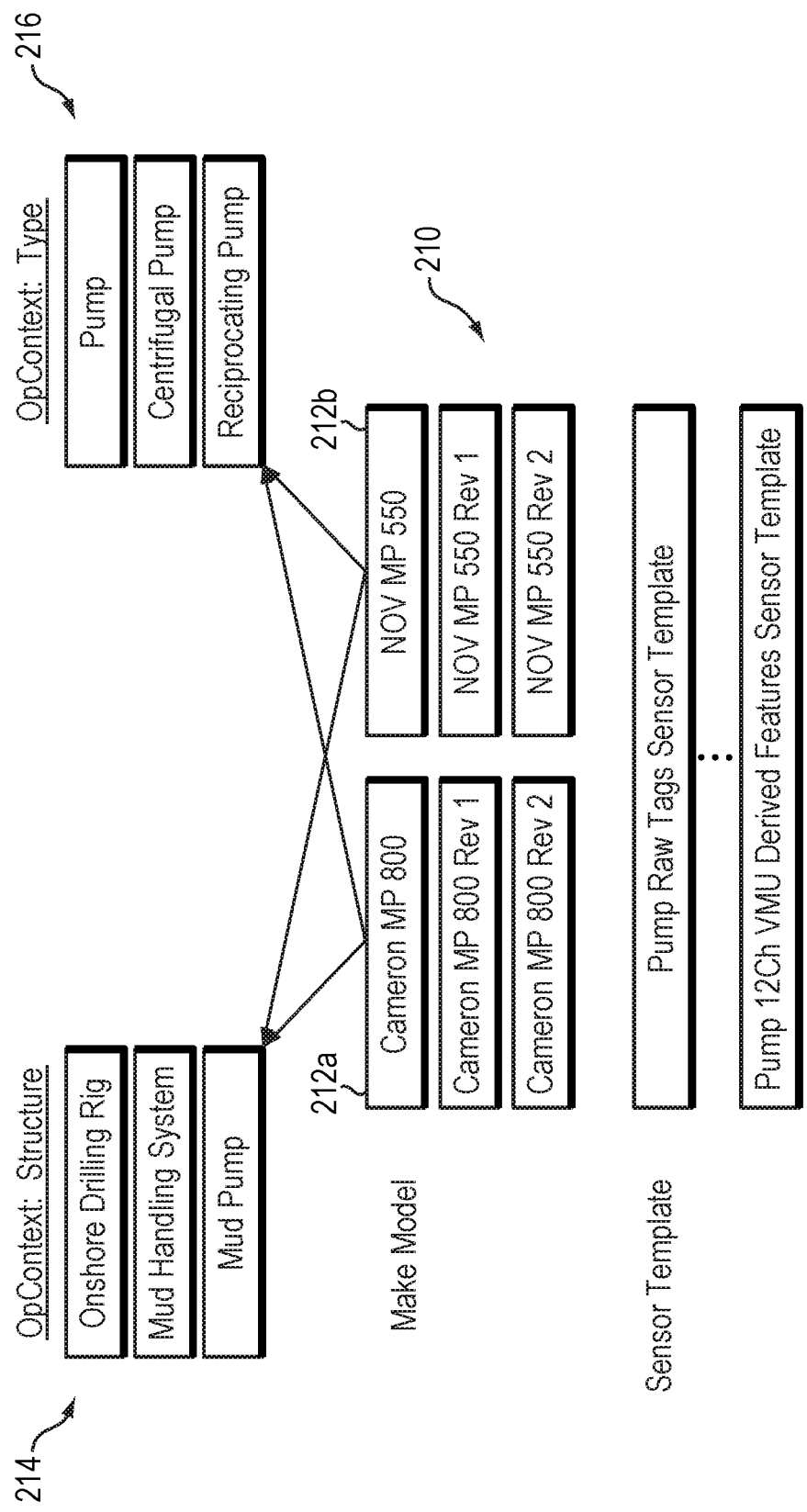

FIG. 2A depicts an exemplary linkage and relationship between sensor templates and equipment taxonomy. In one embodiment a sensor template is created for a collection of equipment 210 to have one or more of the characteristics described above in order to provide structured metadata around the sensor profile for assets 212 in the collection 210. As shown, in FIG. 2A, functionally similar equipment assets 212a and 212b of differing make/model may be linked to the same structure and type of operational context. For example, in FIG. 2A the different mud pumps 212a and 212b are each associated with an OpContext structure 214 of "Mud Pump" and an OpContext type 216 of "Reciprocating Pump".

FIG. 2B lists various types of sensor templates which could be developed for use with the collection of equipment 210. In one embodiment the sensor templates may define tags for "raw" sensor data for each permutation of taxonomy and sensor configuration found in the equipment installations. Typically each make/model of equipment supports a standard set of sensor placements. That being said, sensing devices such as vibration monitoring units (VMUs) are an exception, as each is typically acquired and installed separately from the base equipment asset being monitored. A VMU may typically be used in connection with any equipment disposed to rotate during operation. Thus, different sensor templates may be developed for each equipment units for the cases in which a VMU installed and otherwise. In one embodiment a different sensor template is developed for each permutation of the number of channels associated with a particular sensor and, for each permutation, a separate version of the template is developed to accommodate a VMU.

Figure 3:
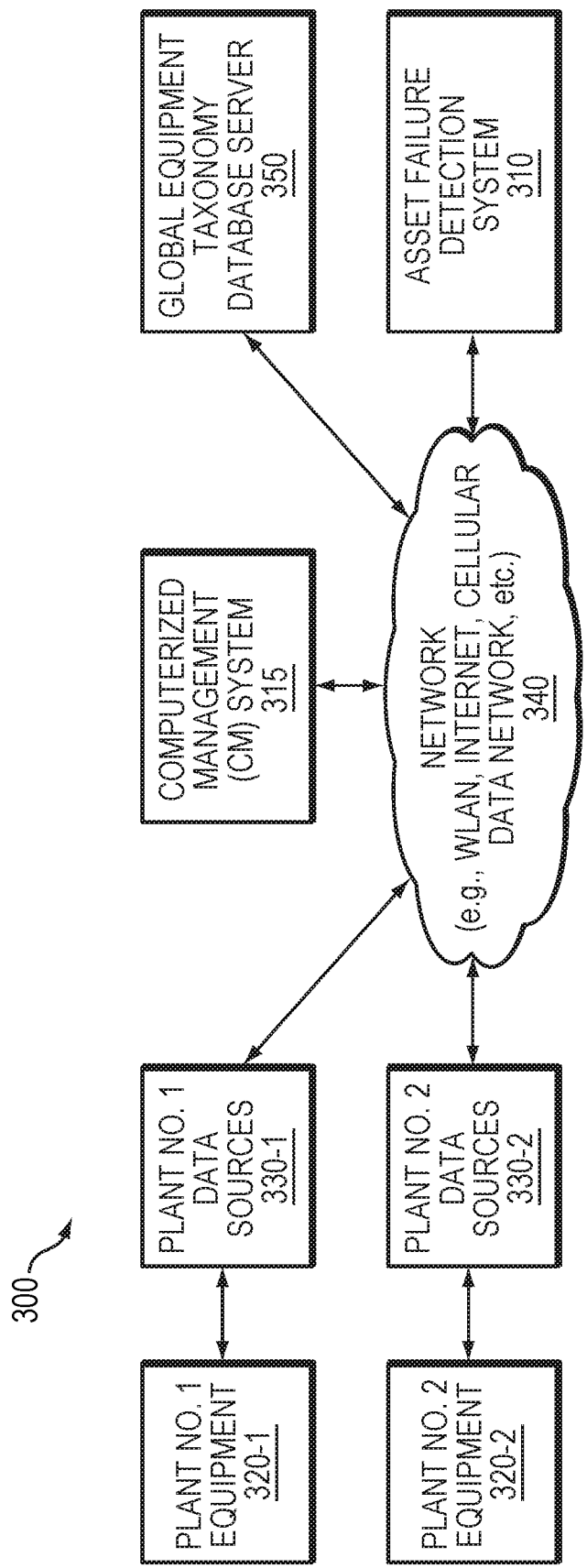
FIG. 3 illustrates a block diagram of an exemplary system for performing asset failure detection using transfer learning in accordance with the disclosure.

Specific Implementation of Asset Failure Detection System Using Transfer Learning Attention is now directed to FIG. 3, which illustrates a block diagram of an exemplary system 300 for performing asset failure detection using transfer learning in accordance with the disclosure. The system 300 includes an asset failure detection system 310, a computerized management (CM) system (also known as a computerized maintenance management system or CMMS), a first plant 320-1 with equipment coupled to first plant data sources 330-1, a second plant 320-2 with equipment coupled to second plant data sources 330-2, a global equipment taxonomy database server 350 and a communication network (e.g., the Internet, a WLAN, a cellular data network or other communication network) communicatively coupling the other components of the system 300.

The asset failure detection system 310 is configured to receive sensor data from the first and second plant data sources 330-1 and 330-2. The asset failure detection system also receives notifications of equipment failures (e.g., work order histories, etc.) from the CM system 315. The failure notifications from the CM system 315 include indications of the types of failures, dates of failures, and failure codes. Using methods described below, the asset failure detection system 310 analyzes the sensor data received from the first and second plant data sources 330-1 and 330-2 in view of the equipment failure notifications received from the CM system 315 in order to develop learning agents to perform the failure signature recognition and anomaly detection methods described below. The CM system 315 is similar to systems described in commonly owned and assigned U.S. patent application Ser. No. 11/740,404, entitled "System and Methods for the Universal Integration of Plant Floor Assets and a Computerized Management System," which is incorporated in its entirety for all purposes. The failure signatures identified through these methods may be communicated to the global equipment taxonomy database server 350 for distribution to other failure detection systems associated with plant assets similar or identical to the plants 320 in order to facilitate the identification of potential failure scenarios involving such assets. In addition, failure signature information provided by the database server 350 may be received by the asset failure detection system 310 and used during operation of the plant equipment 320 in order to identify circumstances in which the equipment 320 may be likely to fail.

The first and second plants 320-1 and 320-2 each include various plant equipment that is monitored by various sensors in the plant data sources 330-1 and 330-2 respectively. The first and second plant data sources each include a plant historian system (not shown) that stores Tag information related to sensors in the plant data sources 330.

For each plant 320, the CM system 315 stores data indicative of equipment hierarchy, equipment type (e.g., metadata. defining equipment type, e.g., a centrifugal pump versus a non-centrifugal pump, but no Tag information) and work order histories for the plant equipment in the plants 320.

The asset failure detections system 310 enumerates Tags from the plant historian and matches these to the equipment types and hierarchy stored in the CM system 315. This enables multiple equipment of similar types to contribute to the failure history analysis performed at the asset failure detection system 310.

Figure 4:
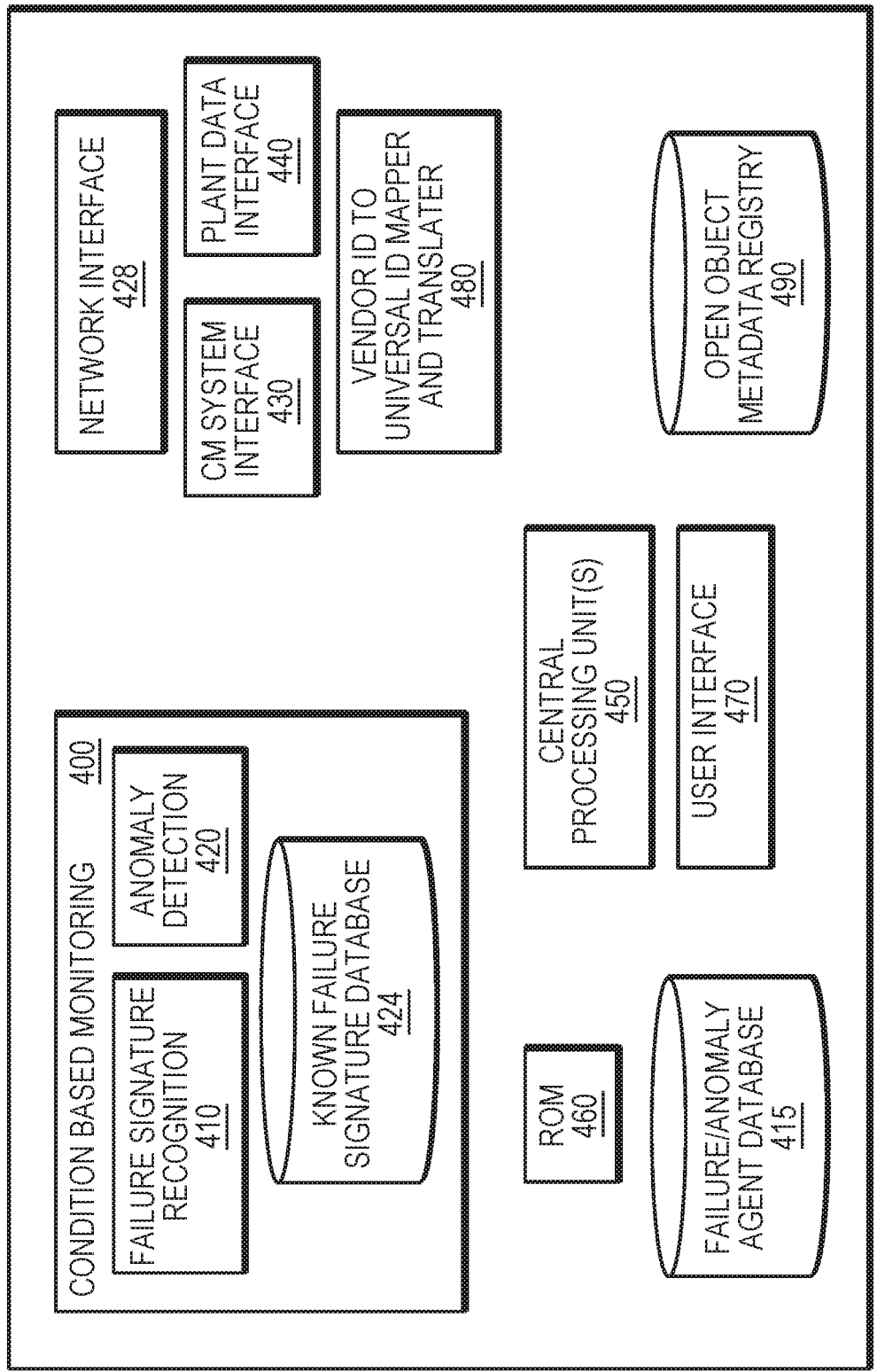
FIG. 4 is an exemplary block diagram of an asset failure detection system for performing asset failure detection in the system of FIG. 3.

Referring to FIG. 4, an exemplary block diagram of an asset failure detection system 310 for performing asset failure detection in the system of FIG. 3 is shown. The asset failure detection system 310 can be a computer server or servers. The asset failure detection system 310 includes a condition based monitoring (CBM) subsystem 400 that includes a failure signature recognition component 410, an anomaly detection component 420 and a known failure signature database 424.

The CBM system 400 is communicatively coupled to a plant data interface 440 which is in turn connected to the network 340 and to the plant data sources 330. This connection to the plant data sources 330 allows importation of sensor data from plant historians at the plant data sources 330. The sensor data is used to train learning agents for the failure signature recognition component 410 and the anomaly detection component 420. Information defining or referencing failure signatures recognized by the component 410 may be stored within the known failure signature database 424. In addition, the database 424 may store information defining or referencing failure signatures received from the global equipment taxonomy database server 350, such failure signatures having been derived from sensor data and/or aggregates associated with plant equipment similar or identical to the plants 320.

The CBM subsystem 400 is also communicatively coupled to a CM system interface 430 that is connected to the network 340 and to the CM system 315. As is described below, the CBM subsystem 400 imports work order histories from the CM system 315 to use as part of the failure agent training for the failure signature recognition component 410 and anomaly agent training for the anomaly detection component 420. The failure and anomaly agents are stored in a failure agent and anomaly agent database 415 that includes one or more types of storage medium. The CBM subsystem 400 also manages changes in the plant equipment by monitoring the work order histories from the CM system 315 and the TAG identifiers associated with sensors of the plant data sources 330. In this way the CBM subsystem 400 is made aware of new equipment installed at the plant equipment sites 320. The CBM system 400 communicates new tag and equipment identifiers to a vendor ID to universal ID mapper and translator 480 (referred to herein as the ID mapper 480) which maps vendor IDs to universal IDs and stores these mappings in an open object metadata registry 490. The condition based monitoring system 400 continually polls the CM system 315 and plant data sources 330 for new data, new tags and new equipment. In one embodiment, the CBM subsystem 400 communicates with the plant data sources 330 and the CM system 315 using the Mimosa protocol.

The asset failure detection system 310 also includes one or more central processing units (CPUs) 450, a ROM (or Flash ROM or EEPROM) storage medium 460 for storing program code for execution by the one or more CPUs 450 to perform the processes described herein. A user interface module 470 is configured to output graphical user interfaces to display devices and receive input from input mechanisms of computing devices using the asset failure detection system 310. In one embodiment the user interface includes a touch-sensitive display.

The failure signature recognition component 410 uses pattern recognition techniques to learn when failures are about to occur. The failure signature recognition component identifies fault conditions in the work order histories of the CM system 315, takes the sensor data from the plant data sources and learns failure signatures based on the sensor data.

The anomaly detection component 420 is a forward looking analysis that pulls in past data and builds a multivariate model as to what is normal. For example, the anomaly detections component 420 can look at temperature and pressure time histories and identify abnormal measurements based on trained learning agents. The anomaly detection component 420 can use machine learning as one approach for training. The learning agents of the anomaly detection component are trained to identify an anomaly in the sensor data before a failure occurs. If an anomaly is detected, the affected equipment can be shut down and inspected to identify what may be causing the anomaly before a catastrophic failure occurs.

Figure 5:
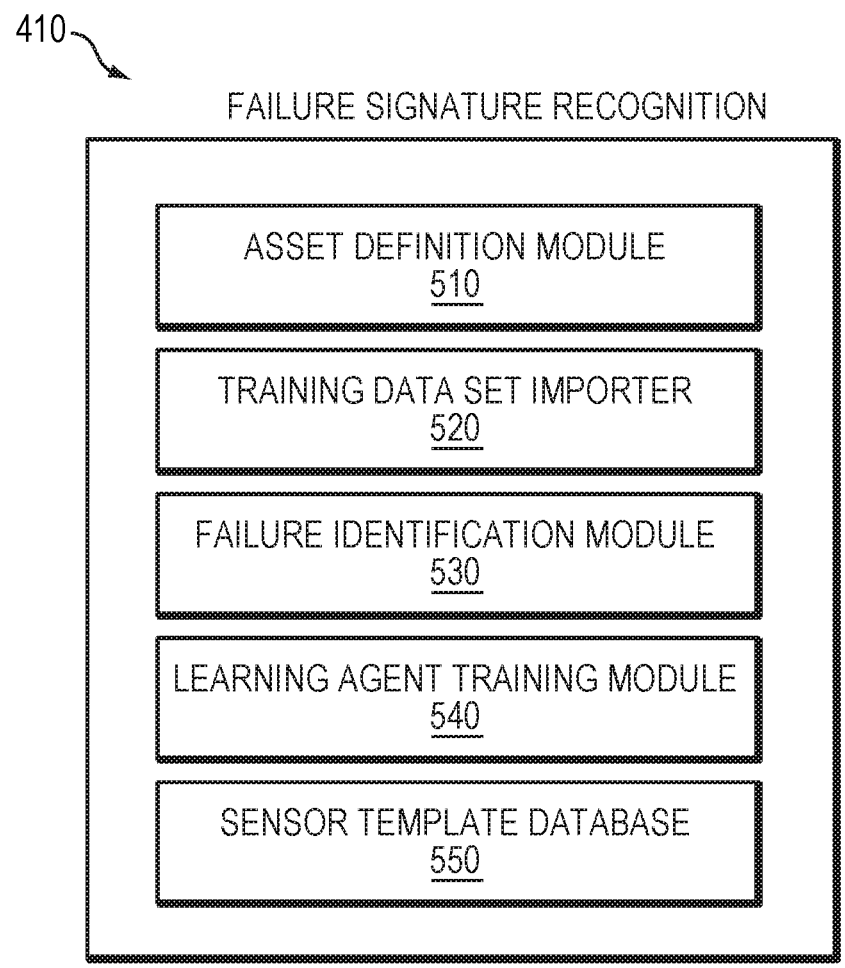
FIG. 5 illustrates various functional modules included within a failure signature recognition component.

The failure signature recognition component 410 is made up of various functional modules as shown in FIG. 5. The functional modules in FIG. 5 are exemplary only and other embodiments can divide the functions differently. The functional modules of FIG. 5 include an asset definition module 510, a training set data importer 520, a failure identification module 530, a learning agent training module 540 and a sensor template database 550. The functions performed by these functional modules will be described in reference to the methods described. herein.

Figures 6C, 6D:
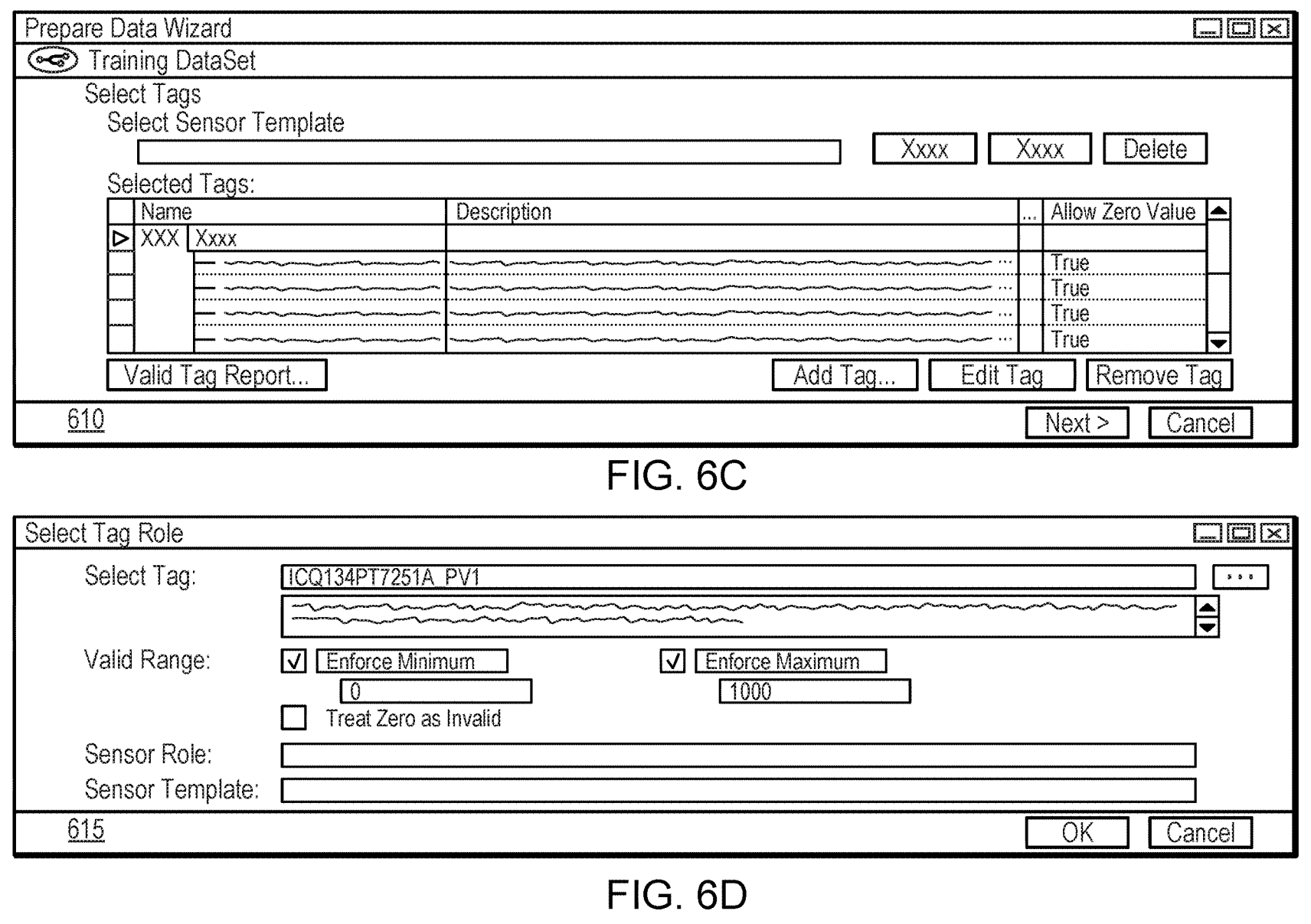
Figures 6E, 6F:
Figure 6K:
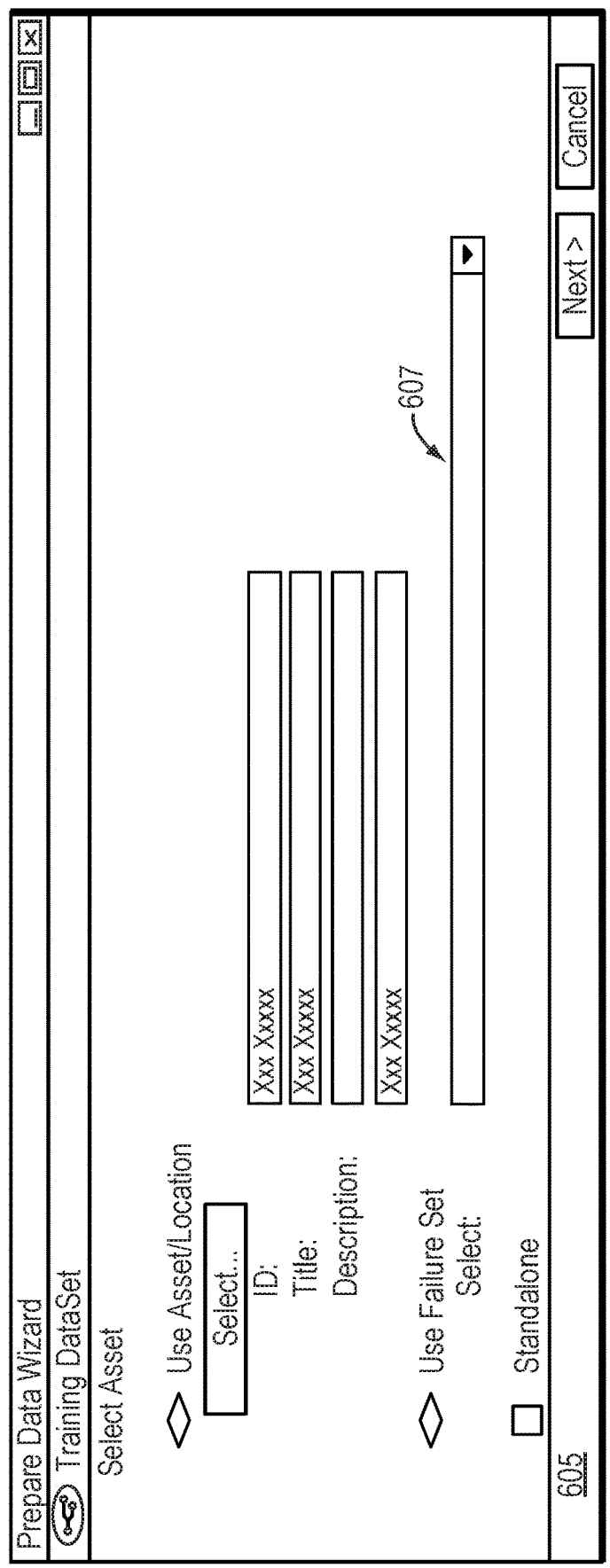
Figure 7:
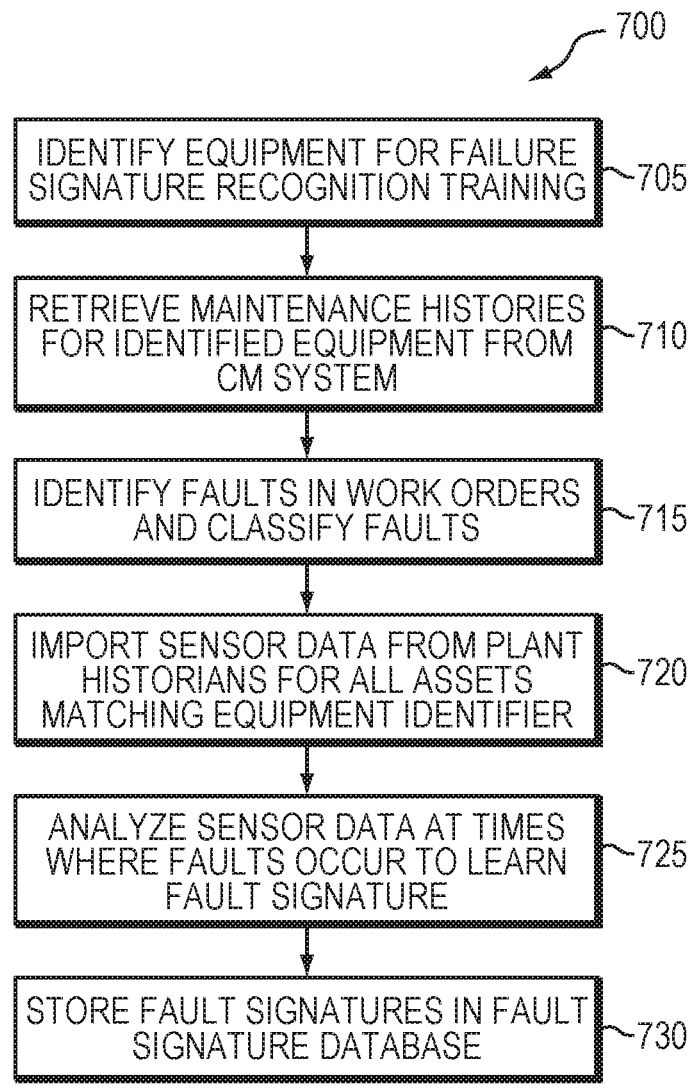
FIG. 7 illustrates an exemplary process for performing failure signature recognition training.

Referring to FIG. 7, a process 700 for performing failure signature recognition training includes the stages shown. In reference to FIG. 7 with further reference to FIGS. 4 and 5, the process 700 begins at stage 705 where the asset definition module 510 receives an input identifying a piece of equipment for which failure signature recognition training is to begin. FIG. 6A shows a user interface screen 600 displayed by the user interface module 470 which a user can indicate a name of a piece of equipment. In FIG. 6A, the user has input the name "mud pump" into a name field. Upon entering the name "mud pump" into the name field, the user interface 470 renders a user interface screen 605 illustrated in FIGS. 6B and 6K. The user interface screen 605 provides the user with three options for selecting an asset: (1) selecting a single asset 606 at a location; (2) select an existing Failure Set 607 if the user wants to create an analysis against a group of assets; and (3) select none to create a standalone analysis 608. In this example, the user enters an ID number identifying the specific pump at a specific location to be analyzed.

After the user selects the one or more assets (or no asset in the case of a standalone analysis), the user interface displays a user interface screen 610 as shown in FIG. 6C. The user can select from a list of tags listed in a tag data store shown in the screen 610. Each tag corresponds to a sensor associated with the pump selected with the screen 605 in this example. A sensor could be associated with an operating parameter of the pump such as pressure or temperature. For each tag in the screen 610, the user is provided with a screen 615 shown in FIG. 6D. The screen 615 allows the user to set outlier removal settings (minimum and maximum) to remove spurious data. If the received sensor data is outside of the minimum and maximum values input by the user, the sensor data is removed from the training data set.

Upon setting all the outlier setting on the screen 615, the user interface 470 renders a user interface screen 620 shown in FIG. 6E. The screen 620 is used to create a sensor template for the chosen asset (the pump). Similar assets have similar sensors and can use the same template. Sensor templates are stored in the sensor template database 550. Different assets could have a subset of the sensors listed on the sensor template. This embodiment uses similar assets to gather profile data for a population and learn from the population data. The sensor template is a framework, but the user customizes the templates. One user's piece of equipment will have different sensor, potentially, than another user's similar piece of equipment. The user can customize the templates such that specific sensors are mapped to the specific tags on a specific piece of equipment.

After completing the sensor template in screen 620, the user interface module 470 renders the user interface screen 625 shown in FIG. 6F. With screen 625, the user is asked to input a rule to detect offline status (e.g., based on amperage or a current flow). The offline status could be an indication of a potential failure. When an asset is detected as being offline, the sensor data is not used for failure signature recognition or anomaly detection. This completes the identification of the equipment at stage 705.

At stage 710, the failure identification module 530 retrieves maintenance histories that have been previously obtained from the CM system 315. The failure identification module 530 provides a screen 630 shown in FIG. 6G, via the user interface module 470, that allows a user to identify failures from maintenance work order history for the selected asset/location, that have been previously received from the CM system 315, from a downtime tracking system, or other 3rd party failure database or spreadsheet. The user can use various filters to help pinpoint which work orders represent failures. Screen 630 shows the failures defined for an asset. The output of this step is to identify a failure condition. The table 631 in the user interface screen 630 includes a date to identify when failure events have occurred. The work orders received from the CM system 315 include the date and a failure code which identifies a failure such as a bearing failure, motor failure etc. The work order maintenance history is enumerated automatically. The heuristics 632 at the top of screen 630 includes ways to allow a user to identify work orders that include certain characteristics. A user can identify failures automatically using this method, but a user can also choose failures manually.

If the user does not have historical work orders for the asset, they can use the "offline status" feature to find past failures. By visualizing past offline conditions, the user can identify unplanned outages, and create a "virtual work order" in the asset failure detection system 310 to identify the failure event which was not properly documented in the CM system 315.

After identifying the failures at stage 715, the process 700 continues at stage 720 where training data set importer module 520 retrieves a set of training data comprising sensor data and related aggregates corresponding to all the tags identified at stage 705 that exhibit changes during the identified failures for the selected asset. The training data is filtered to remove outlier data, data when the asset is offline etc.

Figure 6H:
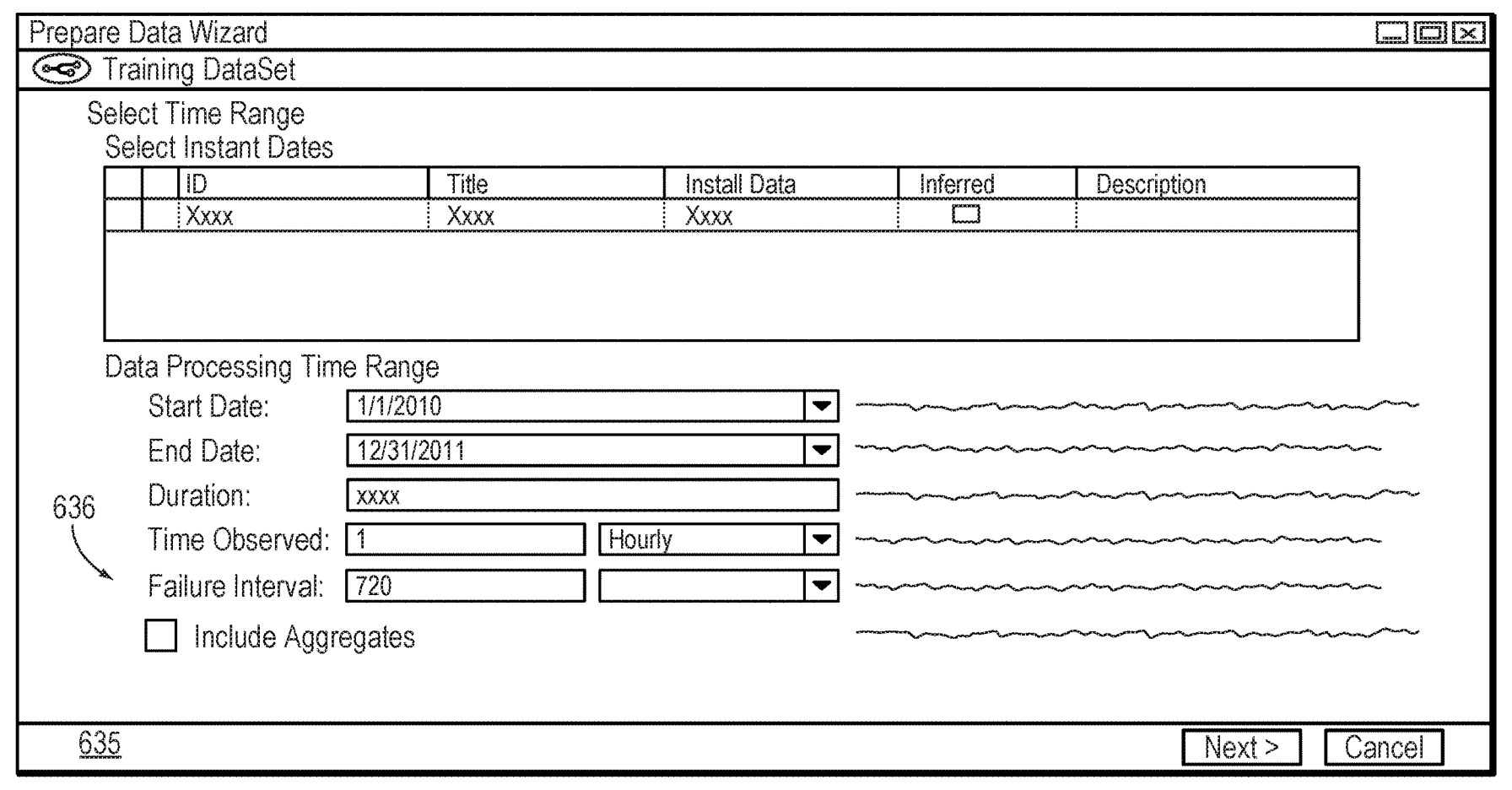

At stage 720, the training set data importer module 520 displays screen 635 shown in FIG. 6H which allows the user to identify a set of training data to import. The training data can include data and related aggregates for any sensor that exhibits a change in condition (i.e., a change in sensor data values or related aggregates) at, or within a selected time period preceding, the time of the identified failure. A user can choose to include as much data as is available, or a user can choose to leave out certain times. The failure interval 636 (720 hours) shown in screen 635 allows a user to break the data into blocks for analysis. Once the time frame data is chosen, the user can choose to import the data to be analyzed.

Figure 6I:
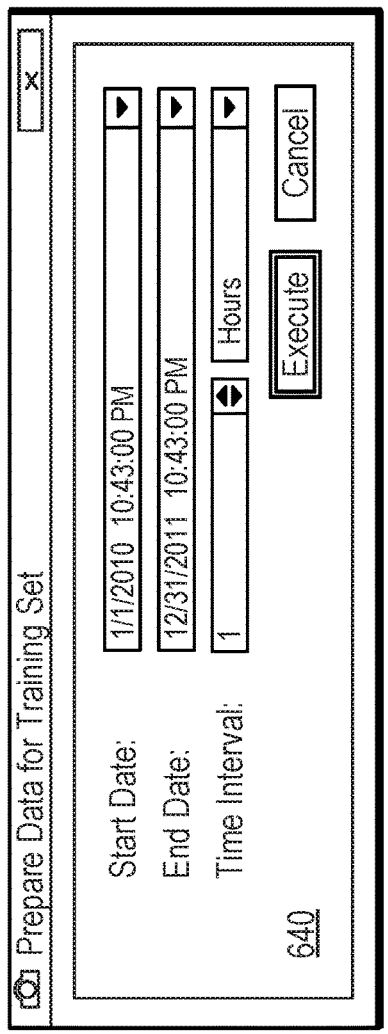
Figure 6J:
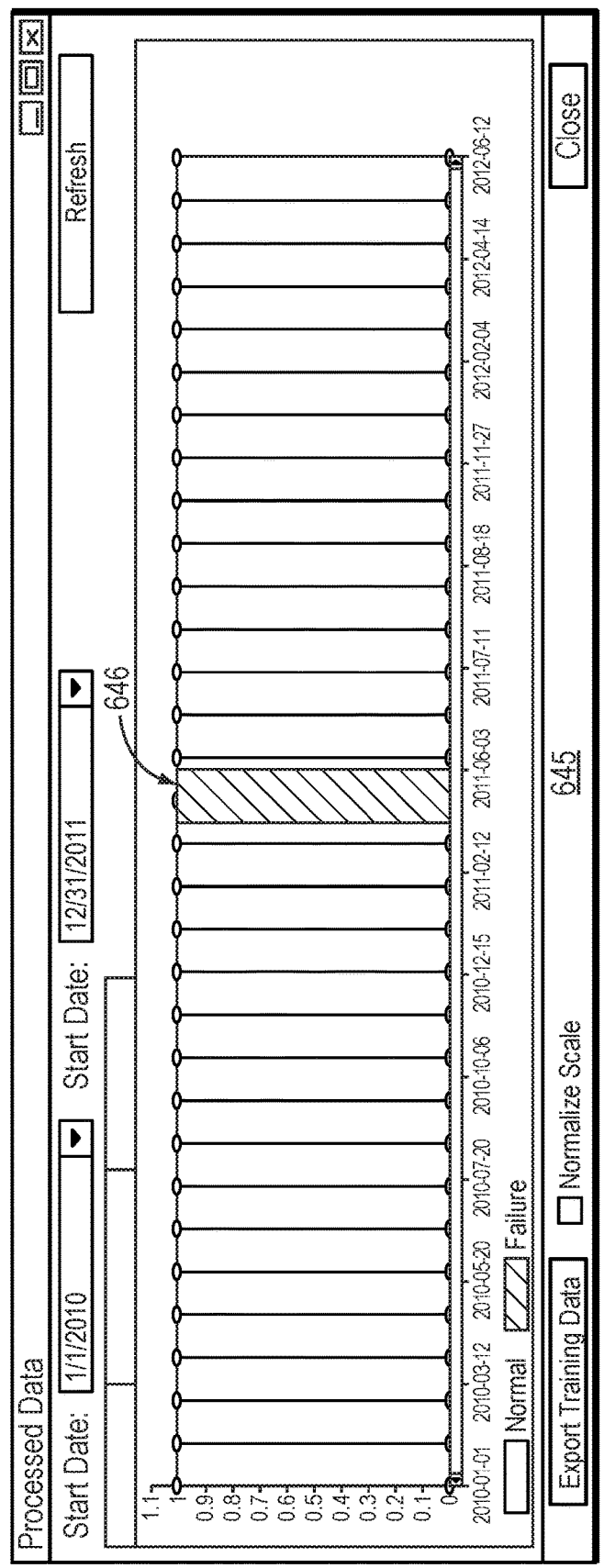

After the user inputs the data identifying which training data to import using the screen 635, the training data set importer module 520 displays a screen 640 shown in FIG. 6I which allows the user to verify the data to be imported. After the user selects to execute the import of the training data with the screen 640, the training data set importer module 520 displays a screen 645, as shown in FIG. 6J, that shows sensor data for normal conditions both before and after a portion 646 of training data that includes the identified failure. The procedures at stages 705, 710, 715 and 720 are repeated for many tags and many pieces of equipment matching the selected asset type until a large amount of data covering a long period of time for a large number of tags for each machine is obtained.

At stage 720, data for all selected tags, as well as all selected failures is imported by the training data set importer module 520 and stored in optimized format for machine learning. Data Interpolation can be used to fill in missing tag data. The imported data is stored with metadata to flag which intervals are failure intervals versus normal intervals. The time interval leading up to failure for which data is most important is configurable based on a "prediction interval" specified for the Training Dataset (i.e. 30 days).

The user-specified "prediction interval" is a hint to the system as to a starting point for the learning algorithm employed at stage 725. The learning algorithm automatically tunes the prediction interval by evaluating multiple interval durations, and selecting the one with the highest predictive accuracy for the past failure signatures.

At stage 725, the learning agent training module 540 analyzes the sensor data and related aggregates at times leading up to and during the identified failures. The signature of a failure is a characteristic pattern of sensor readings, changes in aggregates, oscillations, some changing variable, etc. By identifying when a failure occurs for a given asset, the sensor data and related aggregates leading up to the failure and during the failure can be identified. Importing the sensor data and related aggregates leading up to and including a failure condition allows the failure signature recognition system to identify what leads up to the failure condition, not just the failure condition.

At stage 725, one or more failure agents are created and trained using the imported training data set. Machine learning techniques such as Resilient Back Propagation (RPROP), Logistic Regression (LR), and Support Vector machines (SVM) can all be used at stage 725. RPROP can be used for certain non-linear patterns, LR enables ranking of tag prediction rank, and SVM enables confidence intervals for predictions.

If multiple failures were identified in the training data set, separate failure agents can be trained for each fault. For example, one might be trained on a bearing failure, and another on a motor failure, which might have different signatures.

Figure 8:
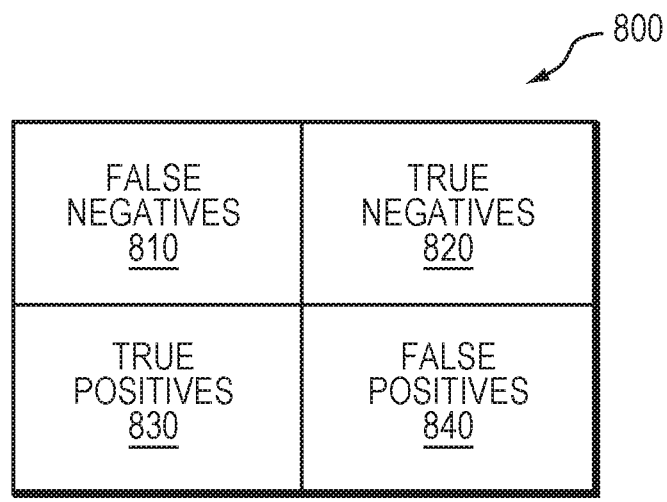
FIG. 8 illustrates a failure space depicting four types of results that a failure agent may experience.

The training at stage 725 involves creating a failure agent that takes in the sensor data and related aggregates in the training set and, using machine learning, parameters of the failure agent are adjusted such that the failure agent successfully predicts the identified failures before the failures occur. The training at stage 725 can use a tuning methodology to avoid certain types of failures. FIG. 8 illustrates a failure space 800 illustrating the four types of results that a failure agent can experience. There are two types of successful predictions including a true negative 820 and a true positive 830. There are also two types of errors, type 1 is a false positive 840 and type 2 is a false negative 810. Type 2 errors can be catastrophic whereas type 1 errors can mean a little down time, but no loss of life. For example, the Deep Water Horizon oil rig disaster was a type 2 failure. Because of the difference in the result of type 1 and type 2 failures, the training at stage 725 can be biased to avoid one type of error more than the other. For example, a user could weigh type 2 failures twice as much as type 1 failures for equipment where a false negative can be catastrophic such as an oil rig. In contrast, if type 2 failures do not result in loss of life, a user could weigh the type 1 failures to be more important.

At stage 725, the user can configure the weightings if they do not agree with the numbers of each type of failure that occur for the training data set. The failure agent can be retrained after each new failure. The failure agent looks at all the sensor data brought in for each piece of equipment. The failure signature recognition training at stage 725 can be accomplished with one sensor measurement and one failure or with hundreds of sensor measurements and hundreds of failures. Data from hundreds of pieces of equipment can help but are not necessary for adequate training at stage 725.

In some cases where prediction models have already been trained, the transfer learning techniques described herein can be used to set default parameters for a starting point for training a new system. This saves time in developing the failure recognition agents for new systems. The learning agent training module 540 can use a failure agent that was trained for old equipment with more sensors than a new pump. In other words, the new pump has a subset of the sensors for an old type of pump. One can put flat line measurements for new sensors into an old agent and retrain the old agent by importing the new sensor data. For example, if you have a failure agent trained for two sensors and you add a new sensor, the learning agent training module 540 can retrain the old failure agent based on the new sensor data using flat lined past history for the new sensor. In other words, the learning agent training module 540 starts with the signature from the prior pump and recalibrates the old failure agent using the old signature and the new sensor data.

After the learning agent training module 540 has finished training the failure agent at stage 725, the process 700 continues at stage 730 where the learning agent training module stores the failure agent in the failure/anomaly agent database 415. The process 700 is exemplary only and modifications to the process can be made without departing from the scope of the methods described herein. For example, stages may be omitted, added or rearranged.

Adaptive Taxonomy-Based Transfer Learning

In one embodiment the transfer learning techniques described herein are performed with respect to collections of equipment linked to a global equipment taxonomy maintained within database server 350. When a new signature is learned for an instance of an asset linked to the taxonomy, a process will check if the signature can be transferred to other "similar" assets, at different levels of the taxonomical hierarchy.

Attention is now directed to a specific example. Consider the case in which a centrifugal pump ("Pump A") associated with 10 tags linked to the equipment taxonomy for: a) Eq Type: centrifugal pumps, b) make-model: Triplex Mud Pump BK-1600, and c) OpContext (structure)—drilling mud pump; which is linked to the appropriate sensor template (10 tags and derived features, i.e., aggregates).

Upon evaluating the sensor information and aggregates described above, assume that a failure signature corresponding to a past failure for Pump A is identified or otherwise "learned". At this point it is desired to determine how many other pumps or pump types could benefit from becoming aware of the learned signature. A service performs may perform this check automatically by first trying to propagate the failure signature to pumps identical or very similar to Pump A; that is, by attempting to propagate the signature throughout the lowest level of the taxonomy (most restrictive set membership). For example, the lowest level of the taxonomy could correspond to a set of pumps having the same sensor template structure, equipment type, make-model, and OpContext.

Figure 9A:
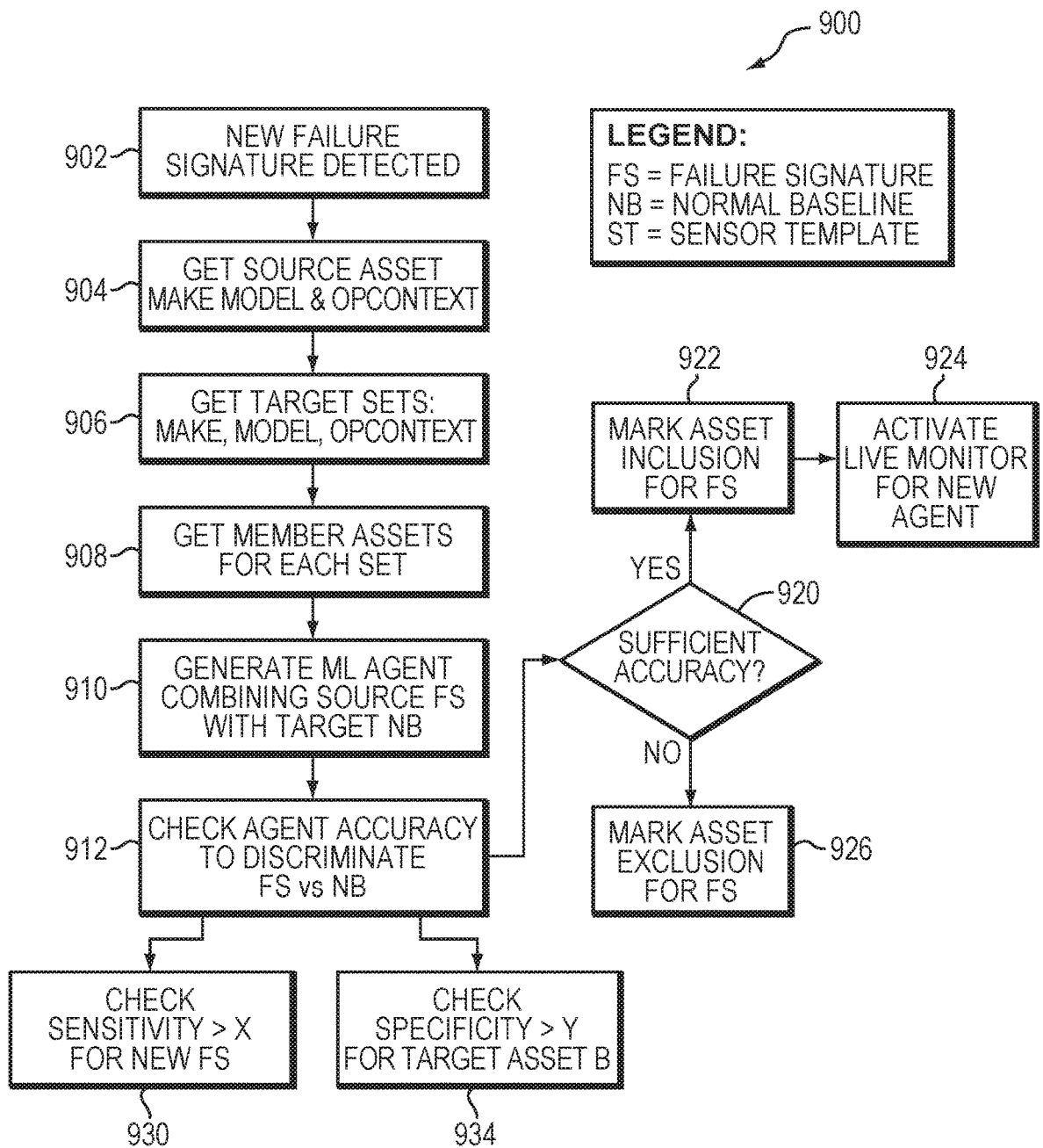
FIGS. 9A and 9B are collectively a process flow diagram illustrating an adaptive taxonomy-based transfer learning procedure in accordance with the present disclosure.
Figure 9B:
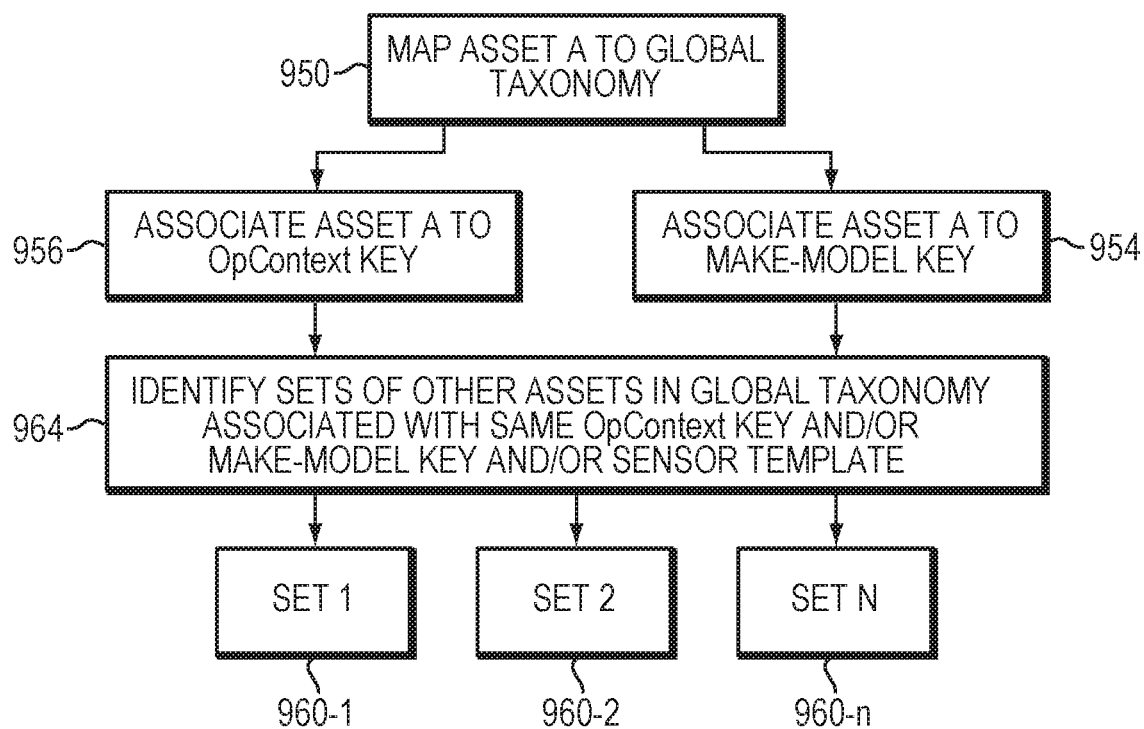

Attention is now directed to FIGS. 9A and 9B, which are flow diagrams illustrating an adaptive taxonomy-based transfer learning procedure that could be performed by such an automatic service. As shown in FIG. 9A, a new failure signature is detected on a source asset, hereinafter referred to as Asset A (stage 902). An OpContext and Make-Model information is then obtained for Asset A (stage 904). As shown in FIG. 9B, during an initial installation it is assumed that Asset A has been mapped to a global equipment taxonomy (stage 950) and associated with a make-model key (stage 954) and a standard OpContext key (stage 956). These keys are used to perform a lookup into a global equipment library in order to identify a number of target sets 960, where each target set is defined as follows (stage 964):

Set 1—all other assets of same Make-Model-Rev, and OpContext Leaf node; with matching Sensor Templates (10 raw sensors of same type and sequence, with all standard derived inputs)

Set 2—all other assets of same Make-Model, and OpContext Leaf node; with matching Sensor Templates Set 3—all other assets of same Make-Model; with matching Sensor Templates Set 4—all other assets of same OpContext Leaf Node; with matching Sensor Templates Set 5—all other assets of same OpContext Leaf Node Parent; with matching Sensor Templates Referring again to FIG. 9A, once these target sets have been identified and the relevant data obtained (stage 906), member assets are determined for each target set (stage 908). A new machine learning ("ML") agent (or simply "Agent") is then generated for each member asset of the collection and the normal baseline data from the target asset and the failure signature data from Asset A are acquired (stage 910). It is then determined whether this acquired data may be used to train a classifier to discriminate between normal and failure data (stage 912). For each asset, if the accuracy of the Agent for the new failure signature is sufficiently high (stage 920), then the asset is marked (for tracking purposes) as being linked to the failure signature (stage 922) and the Agent is activated for online monitoring of the target asset (stage 924). For assets where the accuracy is not sufficiently high (stage 920), the Agent is discarded and the asset identifier is marked as being excluded with respect to the failure signature (stage 926). In one embodiment the determination of whether the classifier may be configured to discriminate between data associated with normal operation and failure data (stage 912) involves comparing the sensitivity relative to the new failure signature to a configurable threshold (e.g., 75%) (stage 930). The specificity for a target Asset may also be compared to a configurable threshold (e.g., 75%), where the failure signature from Asset A has its sensor data re-scaled based on the scaling parameters for Asset B (stage 934).

In other words, an initial pass is perfumed for the most restrictive class membership (identical make-model-revision and operating context), and the set membership criteria is then successively broadened to include assets higher up in the hierarchy:

Try propagating to other revisions for the same make-model and OpContext

Try propagating to other make-models with same OpContext

Try propagating to other OpContexts for same make-model

Try propagating to other OpContexts for other make-model

Figure 10:
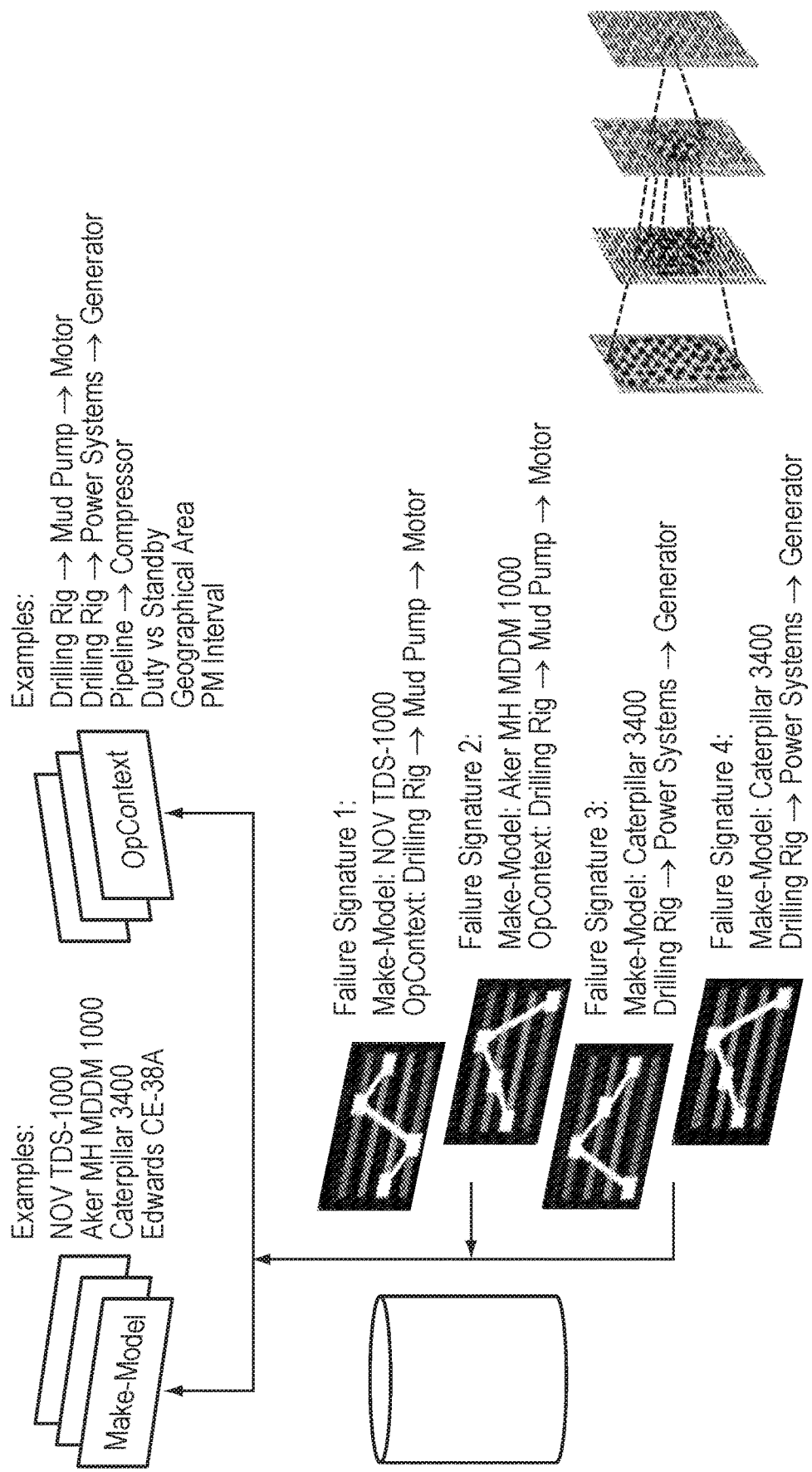
FIG. 10 illustrates a process for transfer learning based upon a global equipment taxonomy.

Attention is now directed to FIG. 10, which provides an illustration of transfer learning based on a global equipment taxonomy. As shown in FIG. 10, in one embodiment the taxonomy lookup is based on a comprehensive database of make-model-revision information, as well as an extensible collection of operating context (OpContext) definitions maintained within the database server 350. An Asset can have multiple OpContext keys/memberships, for example a structural one (Offshore Drilling Rig→Mud Pump), and an equipment type one (reciprocating pump), a regional one (Gulf of Mexico), etc.

Population-Based Learning With Deep Belief Networks

As was discussed above in the sections relating to point-to-point transfer learning, a failure signature from one asset may be combined with a normal baseline from another asset. This combined baseline and failure signature information may then be used to train a classifier to discriminate between the two. In what follows this concept is expanded to support population-based learning, which can be applied to a population of similar assets.

Figure 11:
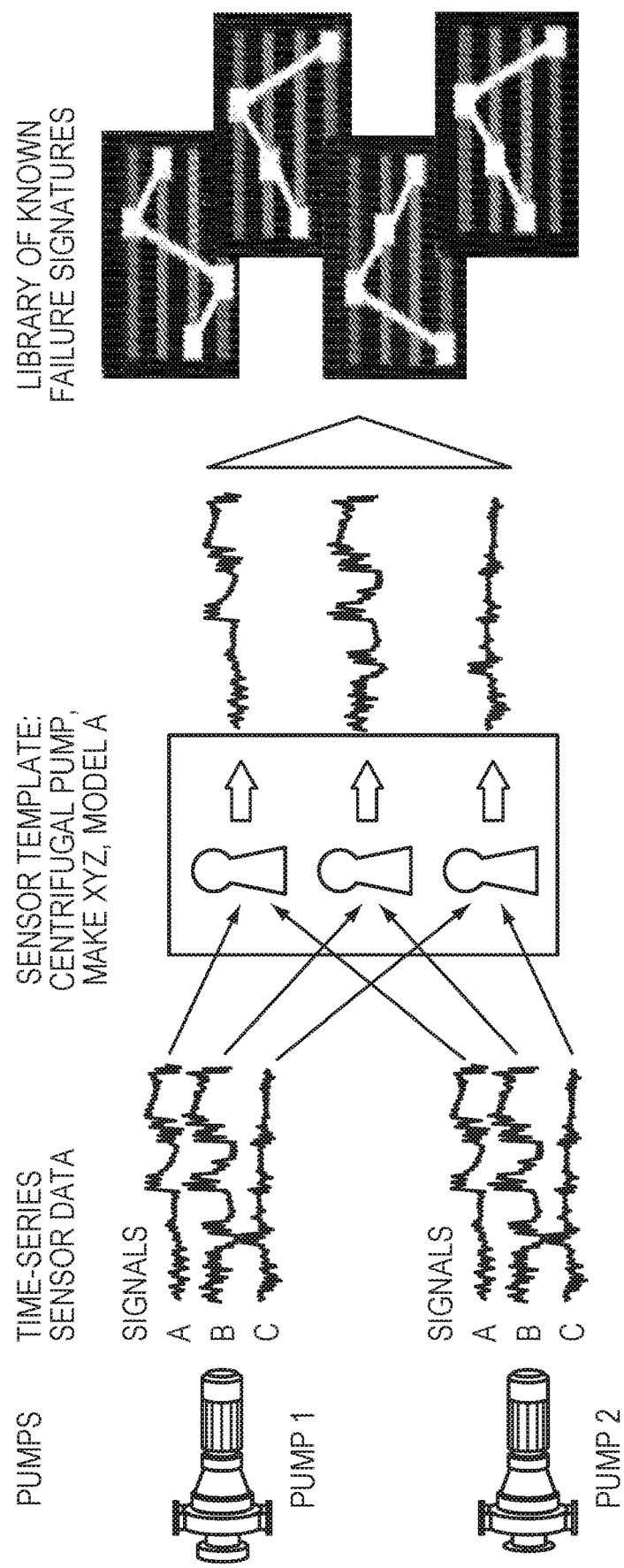

As an example, a population of three centrifugal pumps is selected. Each have the same types of sensor and make/model. The use of a sensor template provides a common "lens" through which to view each pump, as shown in FIG. 11.

Population-Based Learning Process

1. As discussed in the preceding sections, during initial installation assets have been mapped to a global taxonomy, which in one embodiment involves associating the assets to a Make-Model key and a standard OpContext key. These keys are used to perform lookup to a global Equipment Library, in order to create target sets for population-based learning. In order to create a first target set ("Set 1"), an initial pass is perfumed for the most restrictive class membership (identical target parameters of make-model-revision and operating context). Successive target sets (e.g., "Set 2", "Set 3", etc.) may then be created by successively broadening the membership criteria to include assets higher up in the hierarchy. Stated differently, the plurality of matching target parameters for equipment in Set 2. are a subset of the matching target parameters for equipment in Set 1, the most restrictive target set. An exemplary development of equipment target sets is summarized below.

Set 1—all other assets of same Make-Model-Rev, and OpContext Leaf node; with MATCHING sensor templates (subset of Set 2)

Set 2—all other assets of same Make-Model, and OpContext Leaf node; with MATCHING sensor templates (subset of Set 3)

Set 3—all other assets of same Make-Model; with MATCHING sensor templates

Set 4—all other assets of same OpContext Leaf Node; with MATCHING sensor templates Set 5—all other assets of same OpContext Leaf Node Parent; with MATCHING sensor templates 2. For each asset in set, get Normal baseline data (N).

3. Select the target failure mode (FM, type of failure) that is to be learned from the population.

4. For each asset that has had one or more occurrences of this FM, get the Failure Signature (FS) data.

5. if more than 1 total occurrences, partition the FS's into two sets: training set (T), and a validation set (V)

6. Train machine learning agent on combined dataset, using all the combined normal baselines (N) from each asset, and the combined Failure Signatures (FS) from the training set (T).

7. Generalization test: Validate (check accuracy) of the agent by testing it on the example failures from the validation set (V), to see if it successfully generalized the failure signature 8. If successful generalization, then try again with Set 2; and so on through Set 5

An exemplary collection of user interfaces and steps for carrying out the above process are described hereinafter. First, an Equipment Set is created for the three pumps comprising the equipment in the initial target set as follows:

1. Select the target assets (three pumps) from the list of assets (FIG. 12).

Figure 13:
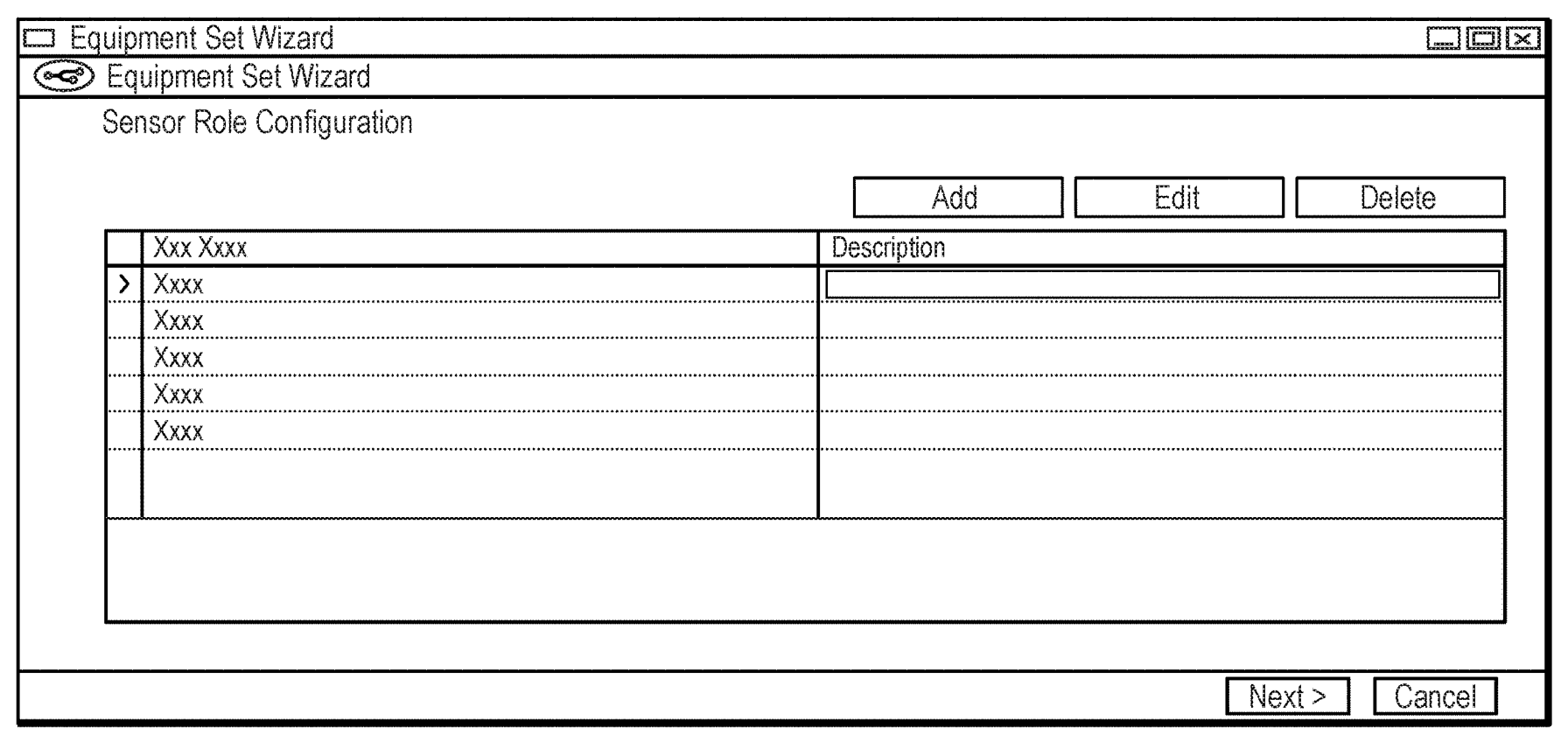

2. Next, a Sensor Template is defined for centrifugal pumps. In this case, five sensor roles are defined. These represent the standard sensors for this population of centrifugal pumps (FIG. 13).

Figure 14:

3. Now that universal sensors (Sensor Roles) have been defined in the Sensor Template, the next step is to map the tags for each asset in the population to their associated Sensor Role. Attention is directed to FIG. 14, which illustrates an exemplary mapping. As shown, in the case of Pump 1 five tags have been mapped from a plant historian to the Sensor Roles (shown in the "Role" column) that belonging to this Sensor Template.

Figure 15:
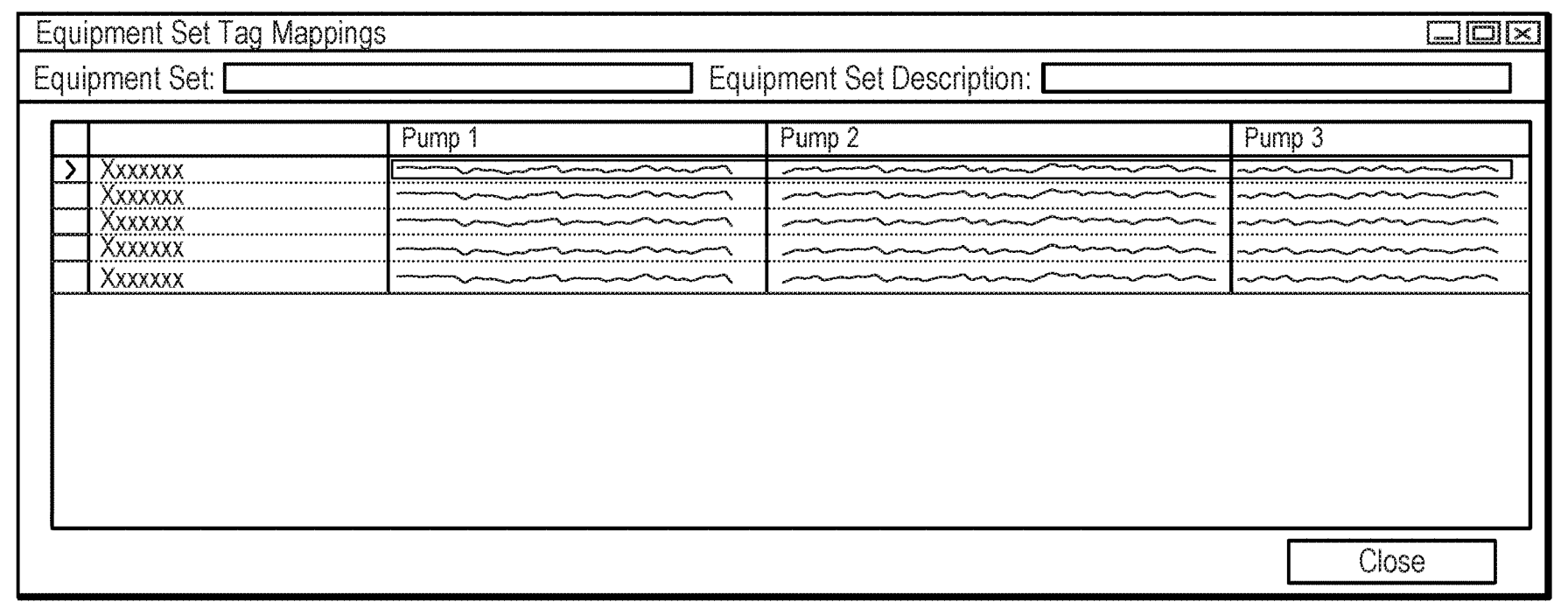

4. A mapping audit report ("Equipment Set Tag Mappings") may then be viewed to verify that, for each asset, all Sensor Roles have been mapped to a tag. As we can see in FIG. 15, there are no gaps, indicating that everything has been appropriately mapped.

Figure 16:
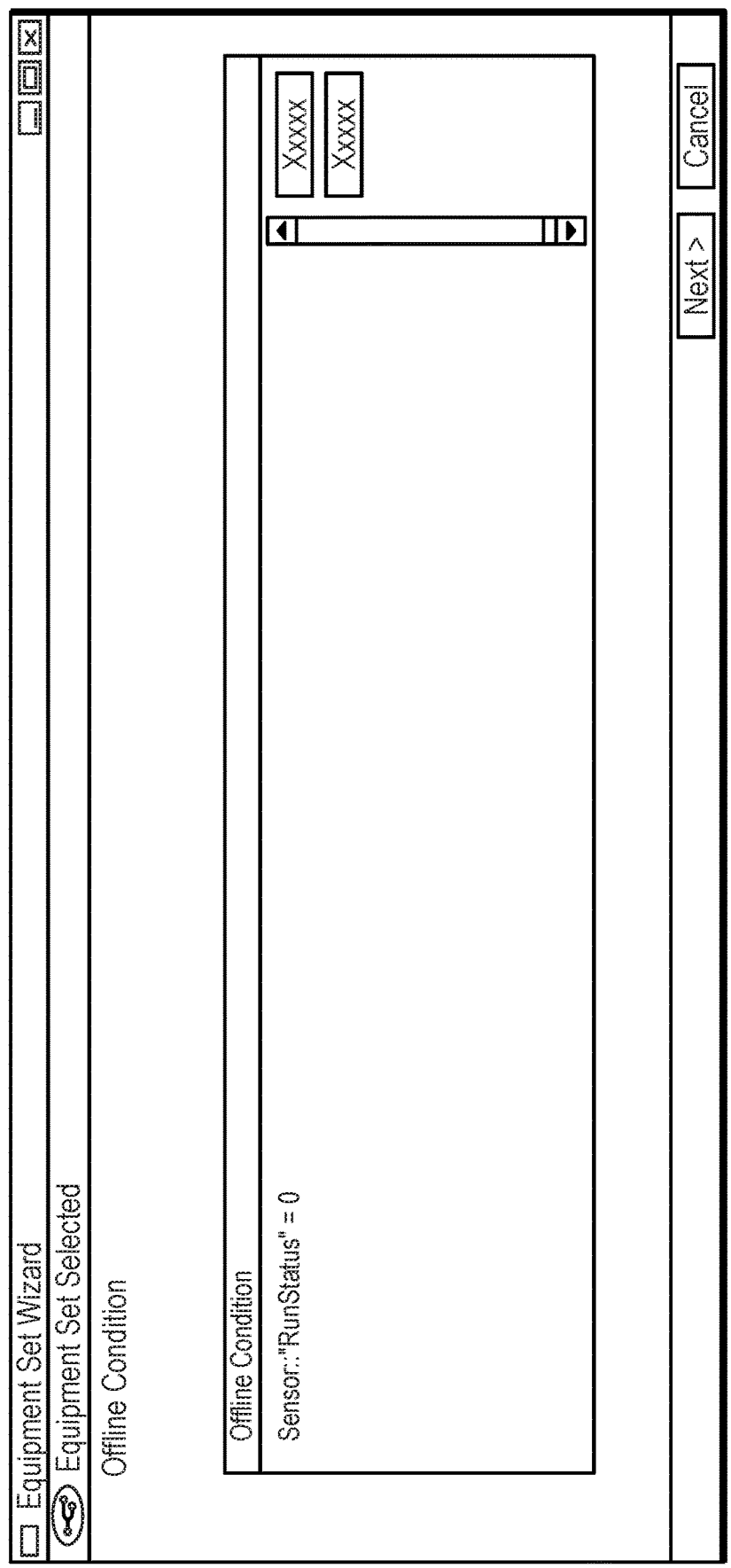

5. In one implementation the next step requires definition of an "Offline Condition". This is a Boolean logic expression, defined based on a Sensor Role, which indicates when the asset is not running (i.e. evaluates to true when the asset is offline). In the example of FIG. 16, the condition "RunStatus"=0 is employed. The offline condition is defined in terms of a Sensor Role, but when the condition is saved, the sensor role is translated to the associated tag for each asset, as shown in FIG. 17.

6. Finally, a name is given to the Equipment Set for this population of centrifugal pumps. In the example of FIG. 18, the population is simply named "Centrifugal Pumps".

The preceding steps relate to creation of an Equipment Set representing a population of similar assets that is desired to be analyzed as a whole. With the Equipment Set in place, the next task is to define a machine learning DataSet based on the Equipment Set. An exemplary set of steps involved in performing this task are describe below.

1. Referring to FIG. 19, a Create DataSet Wizard is launched. The "Select Equipment Set" button is selected to create a population-based DataSet.

2. As shown in FIG. 20, this selection results in display of a dialog that enables selection of any of the available Equipment Sets. In the example of FIG. 2, the "Centrifugal Pumps" Equipment Set defined previously is chosen and all the assets within that set that are desired to be included in the DataSet are selected (in this case all of the three available pumps are selected).

3. Referring to FIG. 21, a user is then presented with a consolidated view of the maintenance history for all three pumps. This enables the user to identify failures from the work orders. This may be done by checking the "Is Failure" column in the list. In the example of FIG. 21, there were two failures for Pump 1.

4. Next, the user selects the date range for each asset (based on how much available sensor data and maintenance data exist). In the example of FIG. 22, the range 1/1/2010 through 8/25/2014 is selected.

Figures 23, 24:
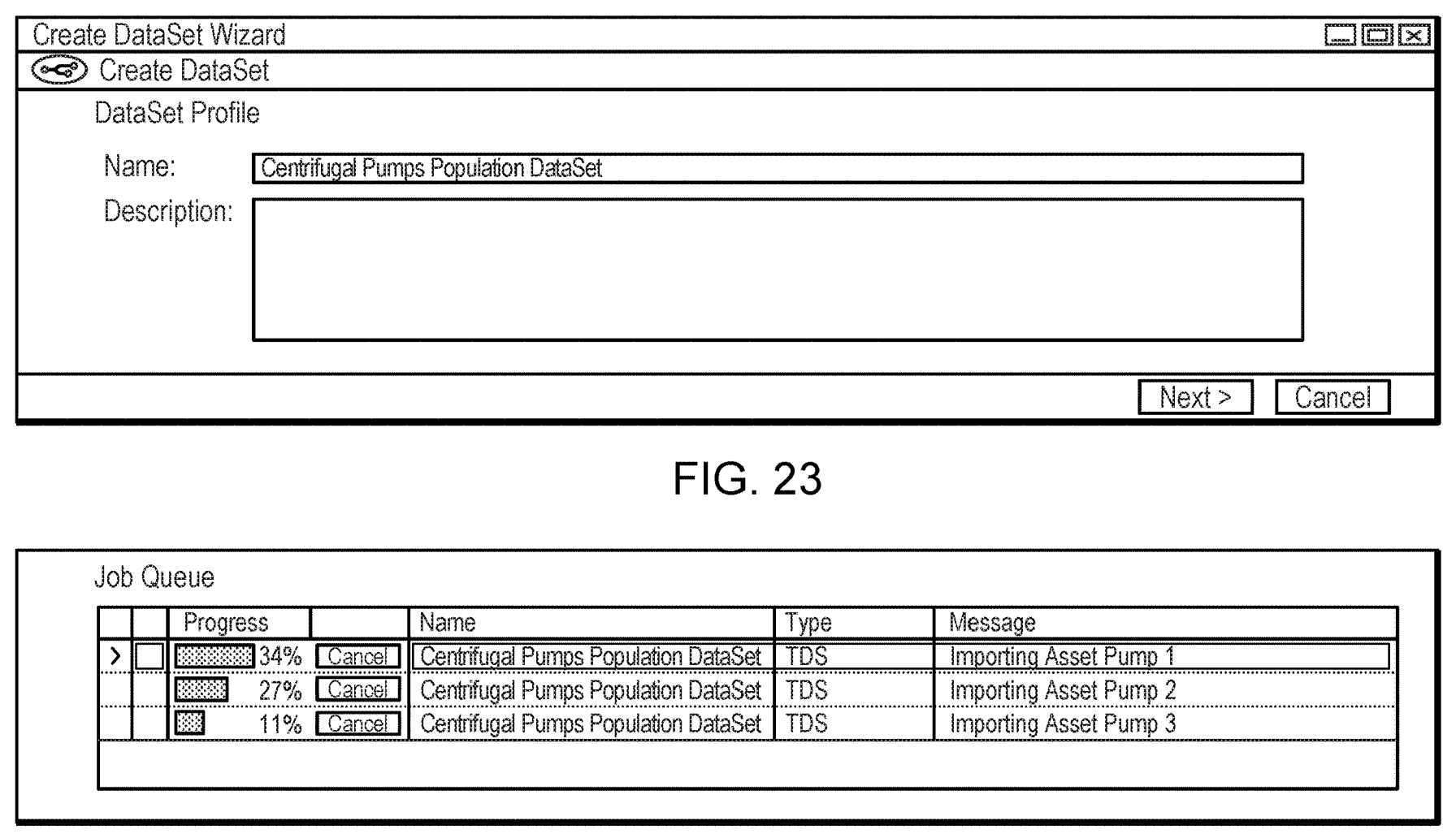

5. Finally, the machine learning DataSet is given a name; in this example, the name "Centrifugal Pumps Population DataSet" is used (FIG. 23).

6. With the DataSet saved, the next step is to import the historical data from the external plant historian into the Mtell database. In this example, this results in importing historical data for all three centrifugal pumps, as shown in FIG. 24.

The preceding steps describe an exemplary process for creating a population-based DataSet for centrifugal pumps. Now that the DataSet has been created, the next step is to create a machine learning Agent. In one embodiment an Agent is an instance of a neural network (or other machine learning algorithm) which has been trained on specific data with a specific set of parameters.

The Machine Learning Wizard may be employed to create the machine learning Agent. In one embodiment a Deep Belief Network is used as the Agent. A Deep Belief Network may entail a network with more than three (3) layers, which incorporates unsupervised feature learning, followed by a second pass with supervised learning. The use of the Machine Learning Wizard to create the machine learning agent is summarized below.

Figure 25:
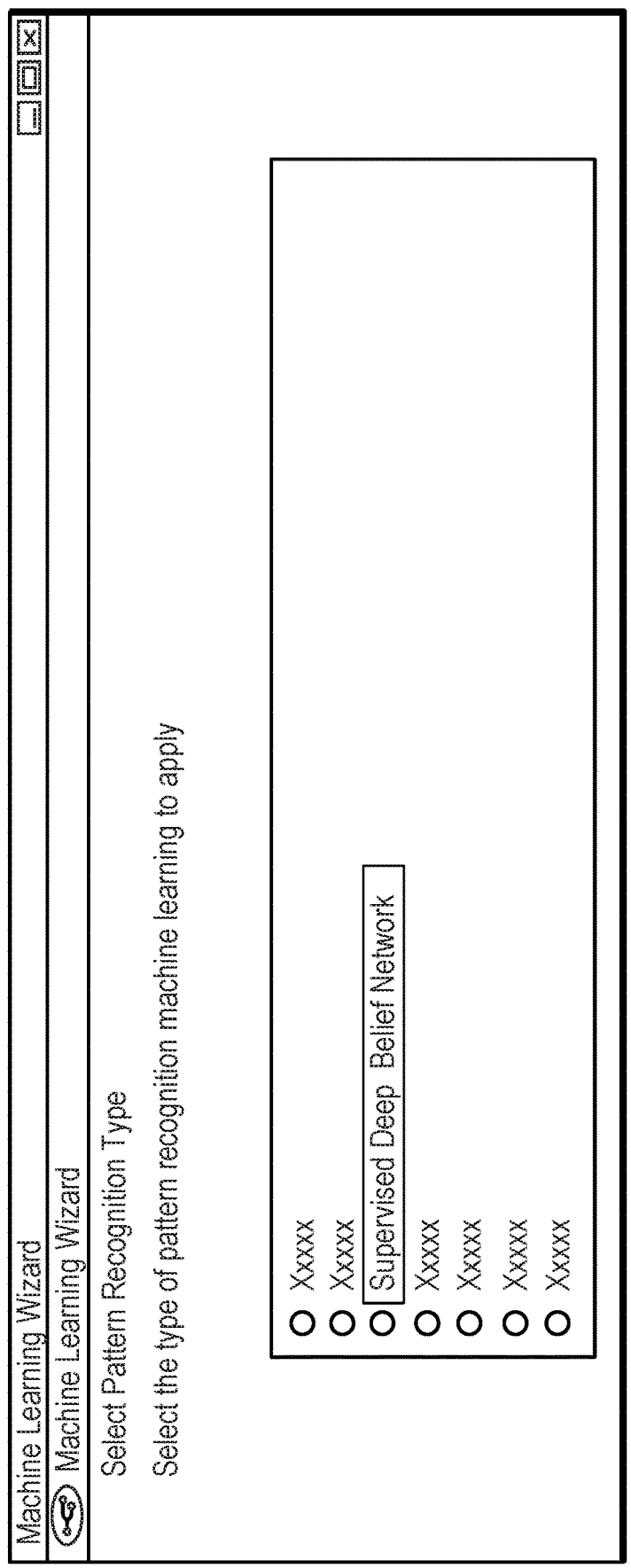

1. Select the agent type—here a Supervised Deep Belief Network for deep learning is selected (FIG. 25)

2. Select Assets for Training—in this step a user may select all of the assets from the population based DataSet, which is three centrifugal pumps (FIG. 26)

3. Select Faults/Failures—in this step, a user may select one or more failures. This provides the "labeled" data that is used for supervised training. Essentially, the failure work order marks a failure interval (the period of time prior to the failure), and all other intervals are considered normal intervals (FIG. 27).

4. After the agent is saved with above settings, the machine learning process is executed.

Training the Deep Belief Network

The network may first be trained using four (4) layers of Restricted Boltzmann Machines (RBMs). Each successive layer may be trained using the output of the previous layer (the first layer uses the raw inputs from the sensor data).

After the pass training the RBMs, the Backpropagation neural network training algorithm may be used to fine tune the weights. This is the step where the labeled failure is used, which tunes the feature detector weights from the RBMs for the classification task.

Figure 28:
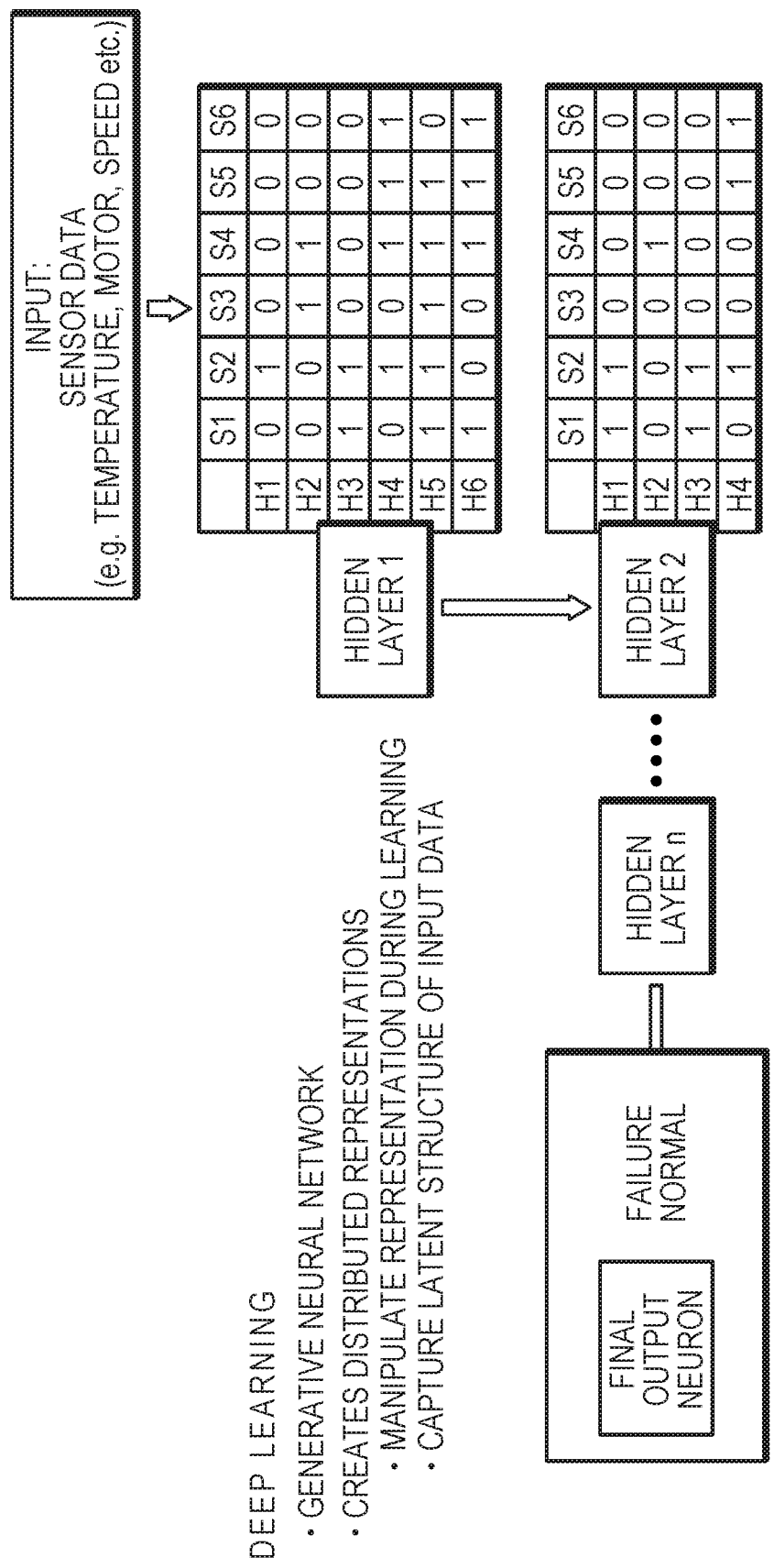

A diagram of this process is shown in FIG. 28, which illustrates how a single output neuron (in the top-most layer) indicates failure vs normal.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

In conclusion, embodiments in accordance with the disclosure provide, among other things, a system and method for automated plant asset failure detection using failure signatures or equivalent information transferred among plant sites consistent with a universal equipment taxonomy. Those skilled in the art can readily recognize that numerous variations and substitutions may be made in the disclosed embodiments, their use and their configuration to achieve substantially the same results as achieved by the embodiments described herein. Accordingly, there is no intention to limit the claims to the disclosed exemplary forms. Many variations, modifications and alternative constructions fall within the scope and spirit of the disclosure.

What is claimed is:

1. A plant asset failure prediction system, the system comprising:
   a memory;
   a network interface; and
   a processor coupled to the memory, the processor being configured by computer code to:
   receive, via the network interface, a first sensor data signal comprised of first sensor data produced by first sensors of a plurality of units of a first asset class;
   receive, via the network interface, a second sensor data signal comprised of second sensor data produced by second sensors of a plurality of units of a second asset class different from the first asset class;
   receive failure information relating to prior failures of the plurality of units of the first asset class;
   determine, based upon at least a subset of the first sensor data and the failure information, a plurality of failure signatures associated with the first asset class;
   analyze the second sensor data in view of the plurality of failure signatures associated with the first asset class in order to identify at least one of the plurality of failure signatures applicable to the second asset class;
   link the second asset class to the at least one of the plurality of failure signatures; and transfer the linked at least one of the plurality of failure signatures to a plant control system and, using the plant control system, control the plurality of units of the second asset class to avert a failure associated with the linked at least one of the plurality of failure signatures.

2. The system of claim 1 wherein the processor is further configured by the computer code to:
receive trend data relating to sensors of a unit of monitored equipment within the second asset class;
perform a comparison of the trend data to the at least one of the plurality of failure signatures; and
generate, based upon the comparing, an alarm signal with respect to the unit of monitored equipment wherein the alarm condition relates to a predicted failure of the unit of monitored equipment.

3. The system of claim 1 wherein the plurality of units of the first asset class are of a first make and model and of a first revision and wherein the plurality of units of the second asset class are of the first make and model and of a second revision different from the first revision.

4. The system of claim 1 wherein the plurality of units of the first asset class are of a first make and model and are associated with a first operational context and wherein the plurality of units of the second asset class are of the first make and model and are associated with a second operational context different from the first operational context.

5. The system of claim 1 wherein each of the plurality of units of the first asset class is configured with a first set of sensors associated with a first sensor template and wherein each of the plurality of units of the second asset class is configured with a second set of sensors associated with a second sensor template matching the first sensor template.

6. The system of claim 1 wherein the processor is further configured by the computer code to analyze the first sensor data and the failure information in order to develop a plurality of learning agents for developing the plurality of failure signatures.

7. The system of claim 1 wherein the processor is further configured by the computer code to analyze the first sensor data over a user-specified prediction interval preceding the failures in order to learn the plurality of failure signatures.

8. The system of claim 7 wherein the processor is further configured by the computer code to identify ones of the first sensors exhibiting a change in condition during the user-specified prediction interval.

9. The system of claim 8 wherein the at least a subset of the first sensor data is produced exclusively by the ones of the first sensors exhibiting a change in condition.

10. The system of claim 1 wherein the failure information comprises work order information and wherein the processor is further configured by the computer code to identify faults in the work order information corresponding to the equipment failures and to classify the faults.

11. The system of claim 1 wherein the processor is further configured by the computer code to analyze the sensor data at times of the prior failures in order to learn at least certain of the plurality of failure signatures.

12. A plant asset failure prediction system, the system comprising:
a memory;
a network interface; and
a processor coupled to the memory, the processor being configured by computer code to:
receive, via the network interface, a first sensor data signal relating to a first equipment unit of a first asset class;
determine, based upon the first sensor data signal and failure information relating to the first unit, a failure signature associated with the first unit;
identify a second equipment unit of a second asset class related to the first asset class within an equipment taxonomy, the second asset class being different from the first asset class wherein first equipment units within the first asset class and second equipment units within the second asset class are of the same functionality;
perform an analysis of second sensor data relating to the second equipment unit in view of the failure signature associated with the first unit;
identify, based upon the analysis, the second equipment unit as being linked to the failure signature associated with the first unit; and
transfer the linked failure signature to a plant control system and, using the plant control system, control the second equipment unit to avert a failure associated with the linked failure signature.

13. The system of claim 12 wherein the first equipment units are of a first make and model and of a first revision and wherein the second equipment units are of the first make and model and of a second revision different from the first revision.

14. The system of claim 12 wherein the first equipment units are of a first make and model and are associated with a first operational context and wherein the second equipment units are of the first make and model and are associated with a second operational context different from the first operational context.

15. The system of claim 12 wherein the processor is further configured by computer code to perform the analysis by training a classifier to distinguish between normal components of the second sensor data and the failure signature.

16. A method for using failure signature information associated with a source unit of equipment to monitor operation of one or more target units of equipment, the method comprising:
identifying a first target set of equipment containing a first target unit of equipment wherein (i) each equipment unit within the first target set of equipment is associated with one or more target parameters equivalent to one or more source parameters of the source unit of equipment and (ii) the source unit of equipment is of a first asset class and the first target unit is of a second asset class different from the first asset class;
determining whether a first machine learning agent may be configured to discriminate between normal baseline data of the first target unit of the second asset class from the failure signature information associated with the source unit of information of the first asset class, wherein the normal baseline data of the first target unit of equipment is derived from sensor signals produced by the first target unit of equipment during operation in a normal mode and wherein the failure signature information is derived from a sensor signal produced by the source unit of the first asset class during operation in a failure mode;
activating, based upon the determining, the first machine learning agent to monitor data included within first sensor signals produced by sensors of the first target unit of equipment, the monitoring resulting in predicting failure of the first target unit of equipment; and
transferring an indication of the predicted failure to a plant control system and, using the plant control system, controlling the first target set of equipment to avert the predicted failure based upon the transferred indication.

17. The method of claim 16 wherein the one or more target parameters include at least one of: (i) make and model, and (ii) operating context.

18. The method of claim 16 wherein the one or more target parameters include: (i) make and model, and (ii) operating context.

19. The method of claim 16, further including:
identifying a second target set of equipment containing a second target unit of equipment wherein each equipment unit within the second target set of equipment is characterized by at least one parameter equivalent to a parameter of the source unit of equipment;
configuring a second machine learning agent to discriminate between normal baseline data of the second target unit of equipment from the failure signature information, wherein the normal baseline data of the second target unit of equipment is derived from sensor signals produced by the second target unit of equipment during normal mode operation of the second target unit of equipment; and
activating the second machine learning agent to monitor data included within second sensor signals produced by sensors of the second target unit of equipment.

20. The method of claim 16 wherein the determining includes determining whether the first machine learning agent may be configured to discriminate between the normal baseline data and the failure signature information with an accuracy exceeding a configurable threshold.

21. The method of claim 16 wherein the source unit of the first asset class is of a first make and model and of a first revision and wherein the first target unit of the second asset class is of the first make and model and of a second revision different from the first revision; and
wherein each equipment unit within the first target set of equipment is associated with one or more target parameters equivalent to the one or more source parameters of the source unit of equipment.

22. The method of claim 16 wherein the one or more source parameters correspond to a first make and model and a first operational context and wherein the one or more target parameters correspond to the first make and model and a second operational context different from the first operational context.

* * * * *

UNITED STATES PATENT AND TRADEMARK OFFICE
CERTIFICATE OF CORRECTION

PATENT NO. : 10,733,536 B2
APPLICATION NO. : 15/721040
DATED : August 4, 2020
INVENTOR(S) : Alexander B. Bates, Caroline Kim and Paul Rahilly Page 1 of 1

It is certified that error appears in the above-identified patent and that said Letters Patent is hereby corrected as shown below:

In the Claims

In Column 20, Claim 16, Line 51, after "target unit" insert -- of equipment --;

In Column 20, Claim 16, Line 59, after "source unit" insert -- of equipment --;

In Column 22, Claim 21, Line 9, after "source unit" insert -- of equipment --.

Signed and Sealed this
Fifteenth Day of September, 2020

Andrei Iancu
*Director of the United States Patent and Trademark Office*